(12) United States Patent
Tyrer

(10) Patent No.: US 7,448,666 B2
(45) Date of Patent: Nov. 11, 2008

(54) GOLF CART COVER WITH INTEGRATED STORAGE BOOT

(75) Inventor: Stephen Edward Tyrer, Northport, NY (US)

(73) Assignee: Club Pro Manufacturing USA, Inc., Farmingdale, NY (US)

(*) Notice: Subject to any disclaimer, the term of this patent is extended or adjusted under 35 U.S.C. 154(b) by 387 days.

(21) Appl. No.: 11/342,332

(22) Filed: Jan. 26, 2006

(65) Prior Publication Data

US 2006/0202503 A1 Sep. 14, 2006

Related U.S. Application Data

(63) Continuation-in-part of application No. 11/216,216, filed on Aug. 31, 2005, now Pat. No. 7,093,883, which is a continuation of application No. 10/107,996, filed on Mar. 27, 2002, now Pat. No. 6,979,044.

(60) Provisional application No. 60/647,330, filed on Jan. 26, 2005.

(51) Int. Cl.
*B60P 7/04* (2006.01)
(52) U.S. Cl. ............................ 296/100.14; 296/77.1
(58) Field of Classification Search ............ 296/77.1, 296/79, 80, 81, 82, 83, 98, 100.01, 100.11, 296/100.16, 136.01, 136.1, 136.11, 138, 296/140, 141; 280/DIG. 5; 160/370.22
See application file for complete search history.

(56) References Cited

U.S. PATENT DOCUMENTS

| | | | |
|---|---|---|---|
| 4,013,315 A | 3/1977 | West | |
| 4,830,037 A | 5/1989 | Held | |
| 5,010,941 A | 4/1991 | Ross, Sr. et al. | |
| 5,217,275 A | 6/1993 | Ridge | |
| 5,259,656 A | 11/1993 | Carroll | |
| 5,568,953 A | 10/1996 | Showalter | |
| 5,588,690 A * | 12/1996 | Showalter | 296/77.1 |
| 5,688,018 A * | 11/1997 | Simpson | 296/138 |
| 5,722,594 A | 3/1998 | Farr et al. | |
| 5,741,041 A | 4/1998 | Sullivan | |
| 5,788,317 A | 8/1998 | Nation | |
| 5,845,957 A | 12/1998 | Hurst | |
| 5,975,615 A | 11/1999 | Showalter | |
| 6,007,134 A | 12/1999 | Weston | |
| 6,206,447 B1 | 3/2001 | Nation | |
| 6,216,714 B1 | 4/2001 | Tucker | |
| 6,220,647 B1 | 4/2001 | Winkler | |
| 6,227,217 B1 * | 5/2001 | Peta | 135/88.07 |
| 6,227,603 B1 | 5/2001 | Brock | |
| 6,416,109 B1 | 7/2002 | Tyrer | |
| 6,481,780 B2 | 11/2002 | Dolan et al. | |
| 6,547,312 B2 * | 4/2003 | Winkler | 296/100.14 |
| 6,601,904 B2 * | 8/2003 | Winkler | 296/100.14 |
| RE38,272 E | 10/2003 | Nation | |
| 6,663,158 B1 | 12/2003 | Showalter | |
| 6,663,161 B1 | 12/2003 | Tyrer | |
| 6,663,162 B1 | 12/2003 | Tyrer | |
| 6,709,043 B2 | 3/2004 | Beusse et al. | |

* cited by examiner

*Primary Examiner*—H Gutman
(74) *Attorney, Agent, or Firm*—Hoffman & Baron, LLP

(57) ABSTRACT

A golf cart cover includes a top surface, and left, right, and rear flaps extending downward from the top surface to enclose the golf cart. One or more of the flap may be individually rolled-up and stored in a storage boot on the cart when not in use. Each boot may include an upper and lower flap, which can be mechanically fastened, such as by a zipper, to fully enclose and protect the stored flaps from wind, sun, rain, debris, and the like.

20 Claims, 25 Drawing Sheets

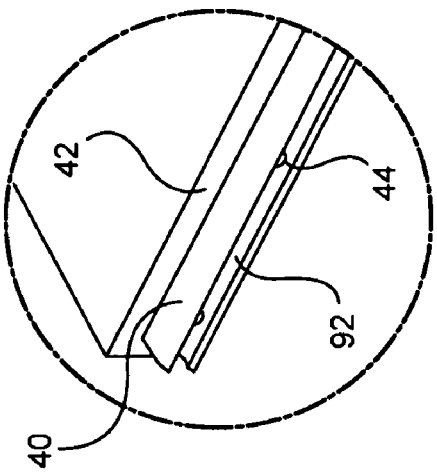
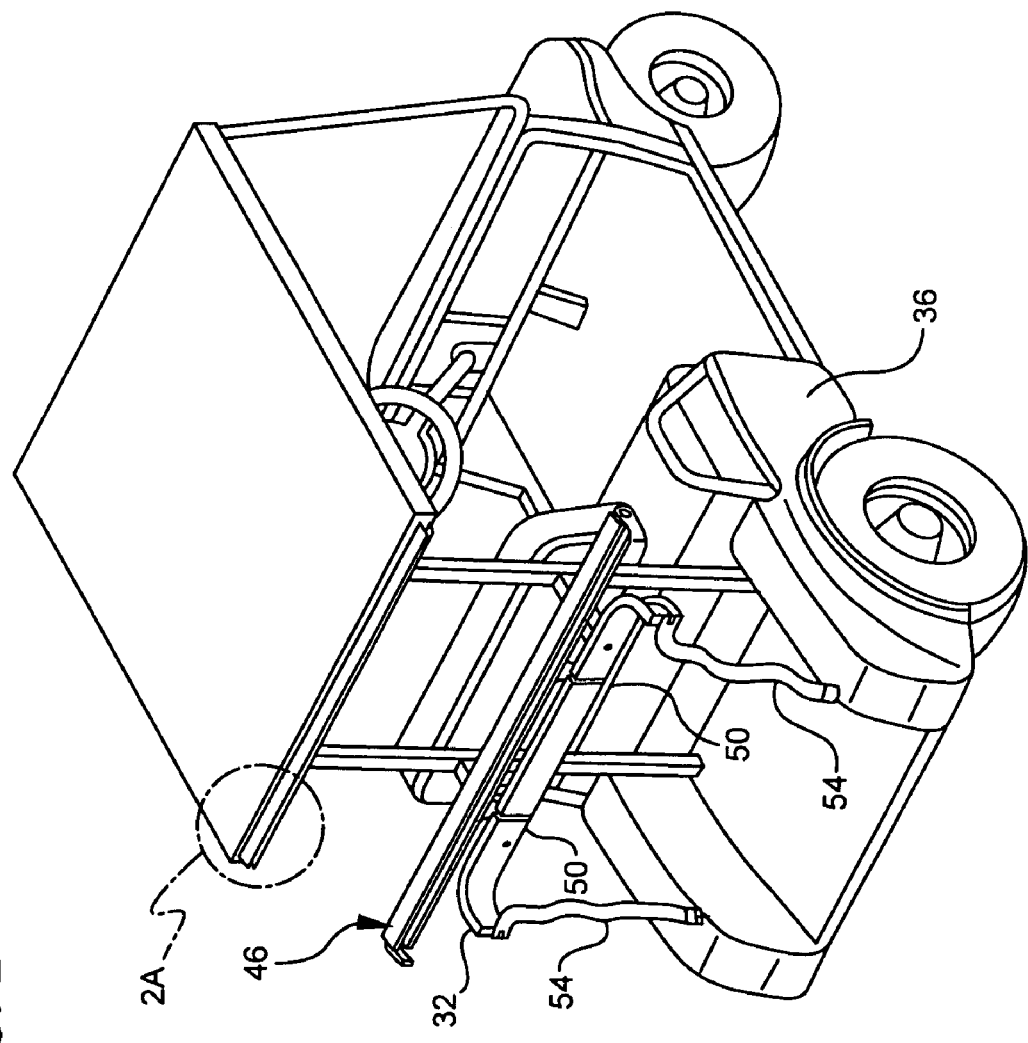

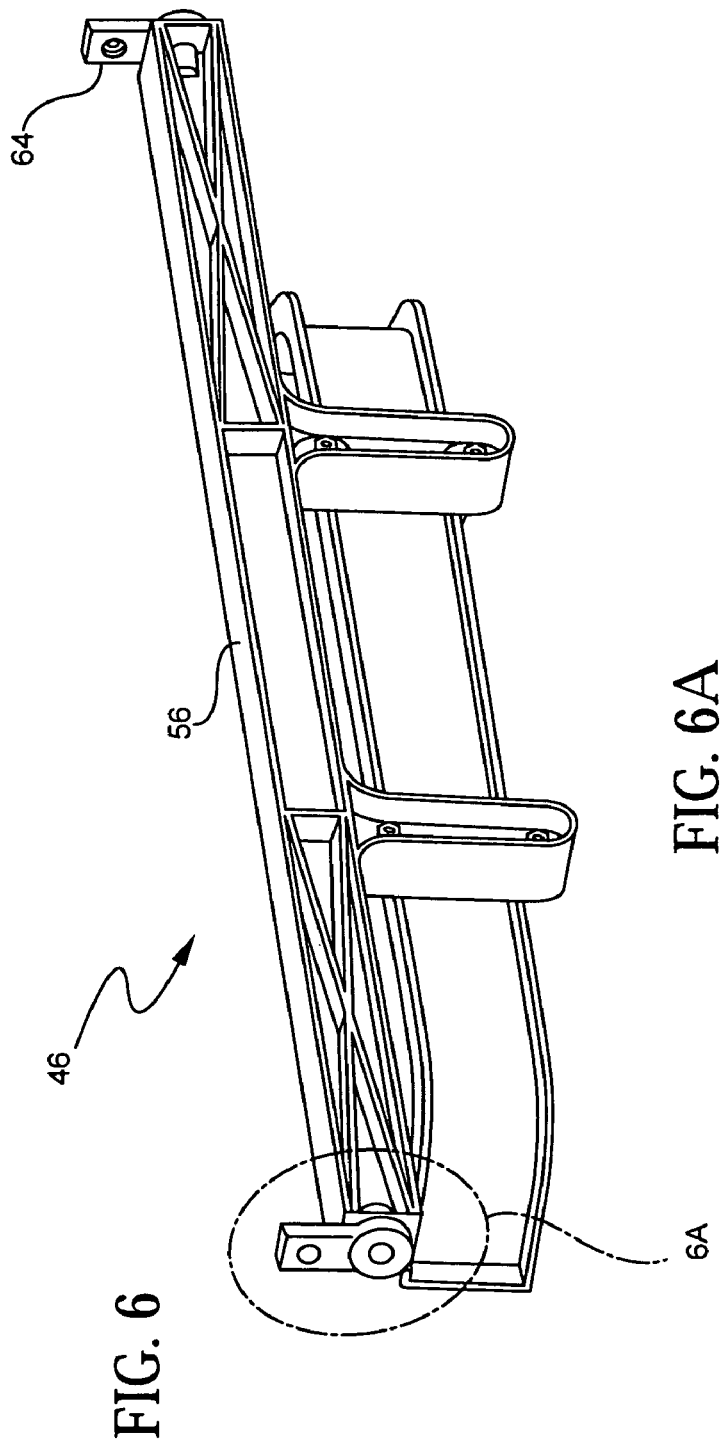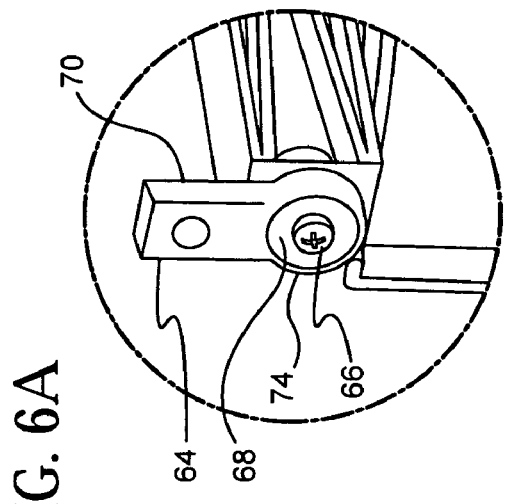
FIG. 6
FIG. 6A

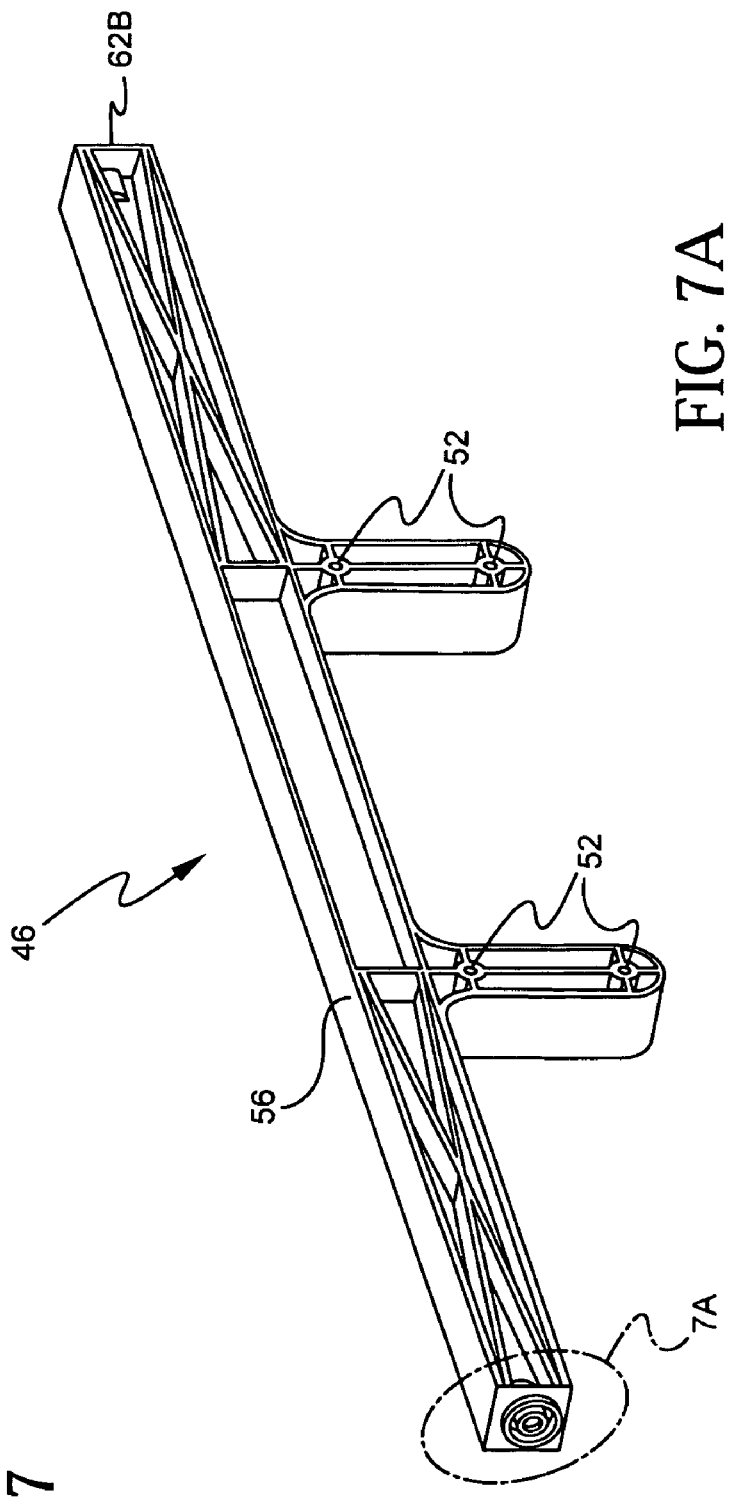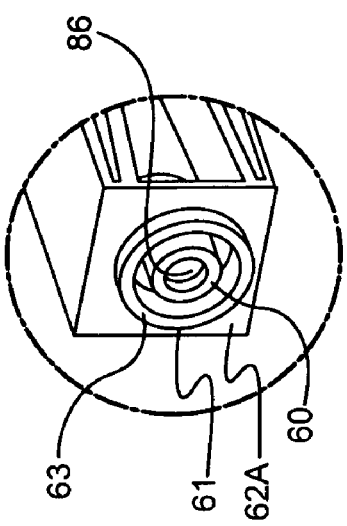

GOLF CART COVER WITH INTEGRATED STORAGE BOOT

CROSS REFERENCE TO RELATED APPLICATIONS

This application is a continuation-in-part application of U.S. patent application Ser. No. 11/216,216, filed Aug. 31, 2005, now U.S. Pat. No. 7,093,883, which is a continuation of U.S. patent application Ser. No. 10/107,996, filed Mar. 27, 2002, now U.S. Pat. No. 6,979,044, issued Dec. 27, 2005, and claims priority to U.S. Provisional Patent Application No. 60/647,330, filed Jan. 26, 2005, which are all incorporated herein by reference in their entireties.

BACKGROUND OF THE INVENTION

1. Field of the Invention

The present invention relates generally to golf cart covers and canopies, and more particularly relates to golf cart covers and canopies having integrated storage boots, within which the covers and canopies can be rolled up and stored when not in use.

2. Description of the Related Art

Canopy covers in the past have been utilized to protect golf bags and clubs located in the rear bag storage compartment of golf carts from rain and damp weather conditions. It is well known in the sport that wet golf club grips can hinder the performance of the player and is undesirable.

Generally, canopy covers attach to the back of the cart's top and to the cart's frame section that supports the top. The connection to the top is typically made with an extruded channel member that accepts the top edge of the canopy. The connection to the cart's frame is made using a structural base member that serves as a mounting base for a frame supporting the canopy. The base member generally attaches directly to the frame of the cart.

The majority of canopy covers in the past fold up and down to allow easy access to the golf clubs stored in the golf bags. It is well known that the rearwardly extending canopy cover hinders a player's ability to reach the golf clubs in the bag. Therefore, canopy cover designers in general allow for the covers to be stored in a folded up position when the cover is not in use. The methods in the past used to retain the cover in the folded position are not atheistically pleasing and generally do not conceal the canopy cover protecting it from weathering elements.

An example of a canopy cover to protect golf bags and clubs is U.S. Pat. No. 4,830,037 to William T. Held. This canopy cover discloses a cover that includes a channel that attaches to the back of the cart's top, base members that attach to the frame of the cart supporting the top of the cart and a canopy structure that supports the flexible canopy and is pivotally attached to the base member. In addition, Held discloses using hook and loop fastening means to retain the cover in the folded up position shown in Held. However, the cover is not neatly stored away when it is folded up. This results in an unsightly looking bundled up cover that is exposed to weathering elements and flops around in the wind when the cart is moving. It is also well known that hook and loop fasteners become clogged with debris, especially for outdoor applications and wear out over time.

Another example of a fold-up type canopy cover to protect golf bags is U.S. Pat. No. 6,220,647 to David R. Winkler. This patent discloses a rearwardly extending folding canopy cover. The canopy includes a flap that is sewn to the outside of the canopy substantially on the top. The flap rests on the top canopy when the canopy is extended to protect the golf clubs. The flap is described and shown as having a substantial width relative to the width of the top of the canopy. The flap is further described to include snaps or hook and loop fasteners that enable the flap to wrap over the top portion of the canopy and supporting brackets and connect to the underside of either the golf cart's top or the underside of the top edge of the canopy. In this way, the flap acts like a strap to retain the canopy in the folded position.

Winkler has several significant disadvantages. The flap disclosed does not protect the entire canopy, therefore, the flap does not provide protection of the canopy from weathering elements. In addition, the flap connects to the underside of the cart's roof or the underside of the top of the canopy. It would be difficult to find the corresponding snaps or hook and loop fasteners since the folded canopy can be very bulky. Additionally, the sides of the canopy are not restrained by the flap disclosed, making them to appear bulky and untidy and allowing the wind to cause them to flutter while the cart is moving. It would also leave the sides of the canopy exposed to wear and tear from branches and other environmental conditions commonly found on golf courses.

Another example of an enclosure to protect golf bags and clubs is U.S. Pat. No. 5,588,690 to Jerry M. Showalter. This patent discloses an enclosure that includes a roof panel, a hem portion coupled to the roof panel, a back cover coupled to the roof panel and a second back cover coupled to the roof panel. The invention described in this patent has several key disadvantages. When not in use, the enclosure's panels are rolled up and retained using straps surrounding the panel and snaps connecting the straps together. Again this retention method has the same concerns as Held in that the panel is not protected from weathering elements and the panel is sloppy and can flop in the wind. In addition, the snaps tend to rust and corrode making them difficult to operate after several seasons. Also, the snaps also can come unsnapped while the cart is moving allowing the panel to unravel.

Another example of a roll-up type cover to protect golf bags and clubs is U.S. Pat. No. 5,741,041 to Diane Sullivan. This patent discloses a roll-up type cover that utilizes a shock cord to attach the bottom of the cover to the cart and hooks to attach the top of the cover to the back edge of the cart's top. This cover utilizes hook and loop style straps to retain the cover in the rolled up position, therefore, it has the same disadvantages as the Held's cover retention mechanism.

Another example of a roll-up cover to protect golf bags and clubs is U.S. Pat. No. 5,688,018 to John Albert Simpson. This patent discloses another roll-up type cover similar to U.S. Pat. No. 5,741,041 to Diane Sullivan and shares the same disadvantages. Simpson also discloses hook and loop style connecting straps that have the previously discussed disadvantages.

Therefore, a rearwardly extending canopy cover that has an improved releasable fastening mechanism for retaining the canopy in a folded up position and that provides protection from weathering elements in that folded up position is desired.

Covers have also been used to protect additional portions of the golf cart and to provide protection for the driver and passengers from rain, wind, and other environmental elements. These covers generally incorporate transparent vinyl sheets that drape down from the roofline to cover one or more open sides of the golf cart.

However, golf cart covers present problems in situations, such as good weather, when the passengers would prefer to have unobstructed access to the inside of the cart. In addition, the unrestricted flow of air through the interior of the golf cart is beneficial in many instances, such as in particularly hot or humid weather.

Under these circumstances, straps with hook-and-loop fasteners have been used to retain the flaps of the golf cart cover after being rolled up to the roofline. In addition, valences attached above the flaps have been used to cover the rolled-up flaps to divert rain and other debris that may get caught therein. However, straps and valences are typically bulky, unsightly, and have not been effective in keeping the rolled-up flaps entirely clean during storage and protected from rips and tears from golf course obstacles, such as tree branches and bushes. This is critical since when the flaps are again rolled down for use, any moisture or debris trapped therein will not only obstruct the view of the passengers, but will be unsightly to other players as well. Moreover, valences will generally flap in the wind from either the movement of the golf cart or the weather and may be blown aside, thereby not offering the required protection to the golf cart cover side flaps when stored.

U.S. Pat. No. 5,788,317 to Nation describes a soft golf cart cover with multiple panels, including a front panel. Straps, fasteners and/or buckles are used to secure the panels when in use, and to secure them in a rolled position when not needed. The front panel is permanently in place and not removable or movable for storage when not needed.

U.S. Pat. No. 5,217,275 to Ridge describes a soft golf cart cover with multiple panels for enclosing the passenger and storage areas of the cart. A center vertical zipper in the rear panel is included to allow access to the golf clubs. When not required, the cover is removed. No storage capability is available for rolling, folding, and/or storing the cover on the cart when not in use.

U.S. Pat. No. 4,013,315 to West describes a soft golf cart cover made up of multiple panels that attach to the top surface of the cart by a combination of suction cups and hook means. Tie cords are provided for securing the panels to each other to prevent entry of rain and wind to the passenger compartment of the cart and to loosely hold the panels in a rolled-up position when not in use. No protection is offered for the bulky rolled up panels when not in use.

U.S. Pat. No. 5,259,656 to Carroll describes a soft golf cart cover made up of multiple individual panels that may be rolled up and stored under valences provided on the cart using straps.

Therefore, there is a need for a golf cart cover that is simple to use and can be retained in a rolled-up state substantially free of moisture and debris, while being aesthetically pleasing to the occupants of the golf cart and those around it. There is also a need to securely fasten a cover to a golf cart, such that portions of the cover are not subject to flapping in the wind.

SUMMARY OF THE INVENTION

The present invention provides a golf cart cover that is simple to use and which can be retained on the golf cart in a rolled-up state substantially free of moisture and debris, while serving as an aesthetically pleasing feature of the golf cart to the occupants and to those around it.

In particular, the present invention includes a cover assembly for a golf cart. The golf cart has a seating compartment, a support frame with vertical support members, and a top frame surface extending over the seating compartment. The cover assembly includes a top surface adapted to overlay the top frame surface of the golf cart and a side flap attached to the top surface. The side flap covers at least a portion of the side of the golf cart in a rolled-down position. The cover assembly also includes a storage boot which is adapted to enclose the side flap in a rolled-up position.

The cover assembly may also include a clamp for fastening at least a portion of the side flap to at least one of the vertical support members. Preferably, the side flap includes a reinforced aperture, through which the clamp is positioned for attaching the side flap to the corresponding vertical support member. The cover assembly may include a first contoured member attached to the first side flap, which has a contour substantially similar to that of a vertical support member, and a clamp securing the first contoured member to the vertical support member, thereby retaining the first side flap to the vertical support member.

In one embodiment, the side flap includes a central portion, a left portion, a right portion, and releasable fasteners for attaching the central portion to the left portion and the right portion. The releasable fasteners for attaching the central portion to the left portion and to the right portion may include zippers, buttons, snaps, and/or hook-and-loop fasteners.

Preferably, the storage boot of the present invention includes an upper boot flap, a lower boot flap; and a releasable fastener for fastening the upper boot flap to the lower boot flap, thereby at least partially enclosing the side flap in the rolled-up position therein. The releasable fastener for fastening the upper boot flap to the lower boot flap preferably includes zippers, buttons, snaps, and/or hook-and-loop fasteners.

In another embodiment, the cover assembly of the present invention may further include a rear flap. The rear flap in a rolled-down position covers at least a portion of the rear of the golf cart. Preferably, a rear storage boot is also included that is adapted to enclose the rear flap in a rolled-up position. Like the storage boot for the side flap, the rear storage boot preferably includes a rear upper boot flap, a rear lower boot flap; and a rear releasable fastener for fastening the rear upper boot flap to the rear lower boot flap, thereby at least partially enclosing the rear side flap in the rolled-up position therein.

In yet another embodiment, the cover assembly may include a front storage boot adapted to enclose the front flap in a rolled-up position. The front flap may be adapted to provide a windshield in the rolled-down position. A clamp may optionally be provided for fastening at least a portion of the side flap and at least a portion of the front flap to at least one of the vertical support members.

Therefore, the golf cart cover in accordance with the present invention is simple to use, and provides integral storage of the protective flaps when not in use. The flaps themselves extend from the top and provide excellent protection from the elements when unrolled and affixed to the cart. The flaps may be retained in a rolled-up storage state substantially free of moisture and debris, and protected from rips and tears from golf course obstacles, such as tree branches and bushes. The optional canopy cover also protects the optional canopy. When either rolled-up or unrolled, the golf cart cover is aesthetically pleasing to the occupants of the golf cart and those around it.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

These and other advantages of the present invention will become more fully apparent as the following description is read in conjunction with the drawings, wherein:

FIG. 2 is a rear perspective view of the golf cart with example canopy attachment members mounted to the cart that may be used with the present invention;

FIG. 2A is an enlarged partial view of an example channel attached to the rear of the top that may be used with the present invention;

FIG. 6 is a rear perspective view of the example base member including the pivot arms secured to the bag support without the cart or the canopy present;

FIG. 6A is an enlarged partial view of the pivot arm mounted on the example base member;

FIG. 7 is a rear perspective view of the example base member only that may be used with the present invention;

FIG. 7A is an enlarged partial view of the end of the example base member;

DETAILED DESCRIPTION OF THE PREFERRED EMBODIMENTS

Figure 1:
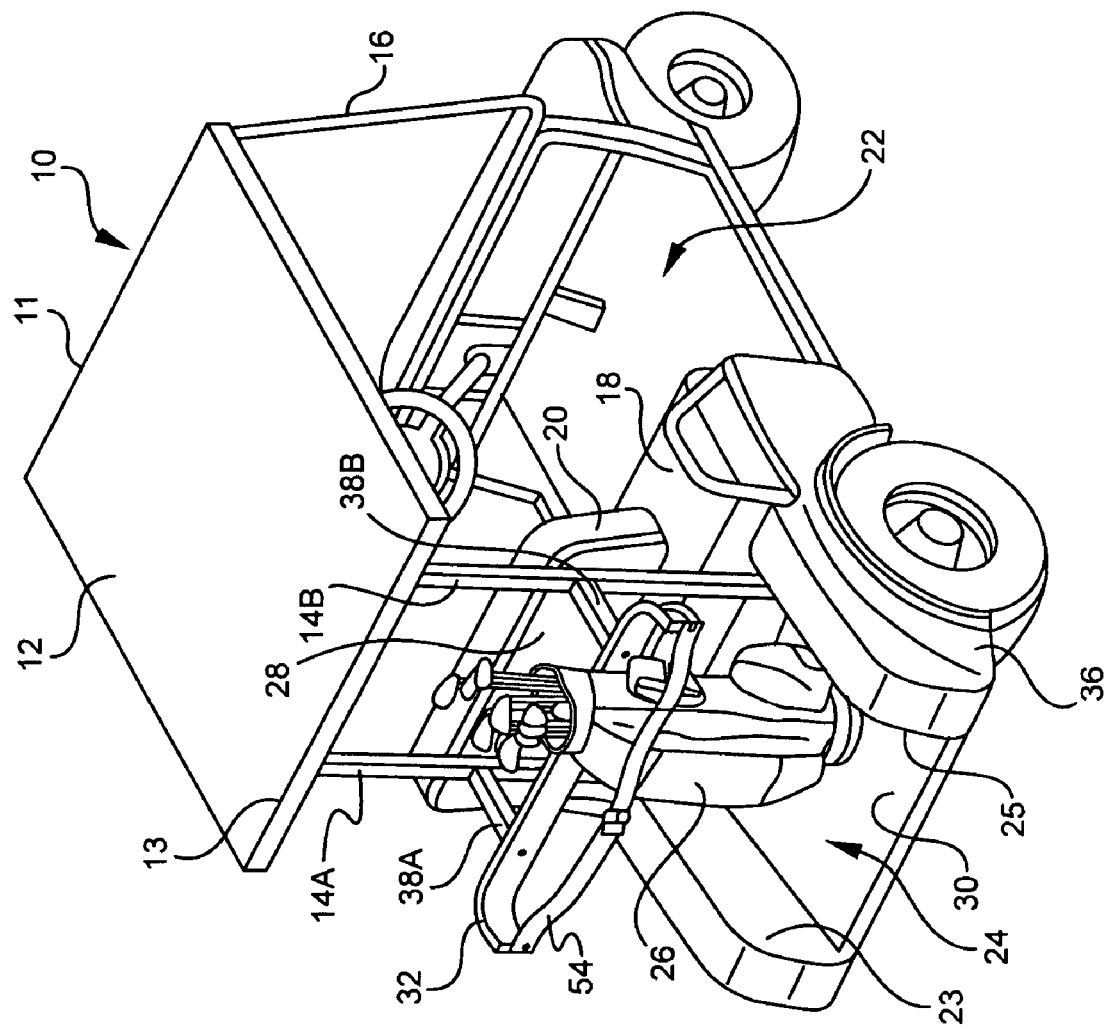
FIG. 1 is a rear perspective view of a golf cart in which the present invention may be used.
Figure 3:
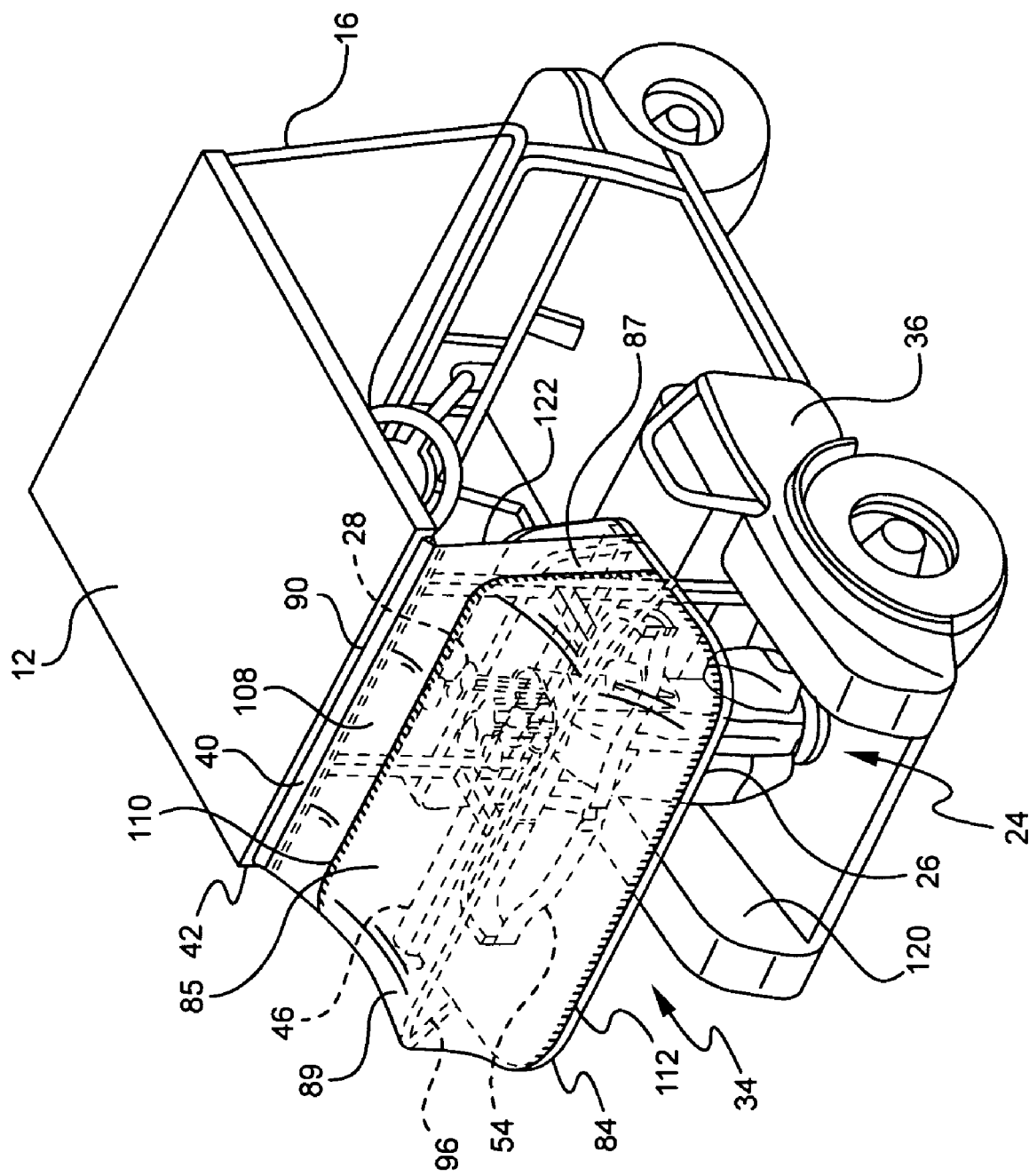
FIG. 3 is a rear perspective view of the golf cart with the present invention attached with the cover extended to protect the golf bag and clubs from rain.

FIG. 1 shows a perspective view of a motorized golf cart 10 to which an embodiment of a canopy attachment in accordance with the present invention, generally indicated as a canopy assembly 34 in FIG. 3, can be attached. Cart 10 has a top 12 that is attached to the upper ends of rear frame members 14A and 14B and the upper portion of a front frame member 16 using fasteners. Top 12 is preferably a molded plastic part and is used to protect passengers sitting in a passenger compartment 22 from rain. The passengers sit on a seat 18 with their back resting on a seat back 20. Behind seat back 20 is a bag storage area 24.

With reference again to FIG. 1, bag storage area 24 is used to store one or more golf bags 26 containing golf clubs 28. The bottom of golf bag 26 rests on a bottom 30 of a cart body 36. The upper portion of the golf bag is supported by a U-shaped bag support 32 that prevents golf bag 26 from tipping over. Bag support 32 is preferably a molded plastic part with straps 54 attached to it to secure the golf bag to the bag support. Bag support 32 is mounted onto golf cart frame extensions 38A and 38B of cart 10 using fastening means (not shown), as for example threaded bolts and nuts. Frame extensions 38A and 38B are made of metal and attached to rear frames 14A and 14B by fastening means, welding or are a continuous extension of the rear frames.

Referring again to FIG. 1, bag storage area 24 is generally formed as part of cart body 36 that opens toward the rear of the cart. The bag storage area is defined by bottom 30, two opposite sides 23, 25 and seat back 20. Top 12 has a front edge 11 and a rear edge 13 and is located above passenger compartment 22. The top does not cover the bag storage area to allow the player to remove golf clubs 28 from golf bag 26 without hitting the golf club on the underside of top 12 while trying to lift the golf club out of the golf bag. Therefore, the bag storage area and the golf bag are exposed to rainfall. In order to protect bag storage area 24, it is necessary to have a cover that can be folded out of the way so that the player may remove the golf clubs without being hindered by a covering directly above golf bag 26.

Figure 4:
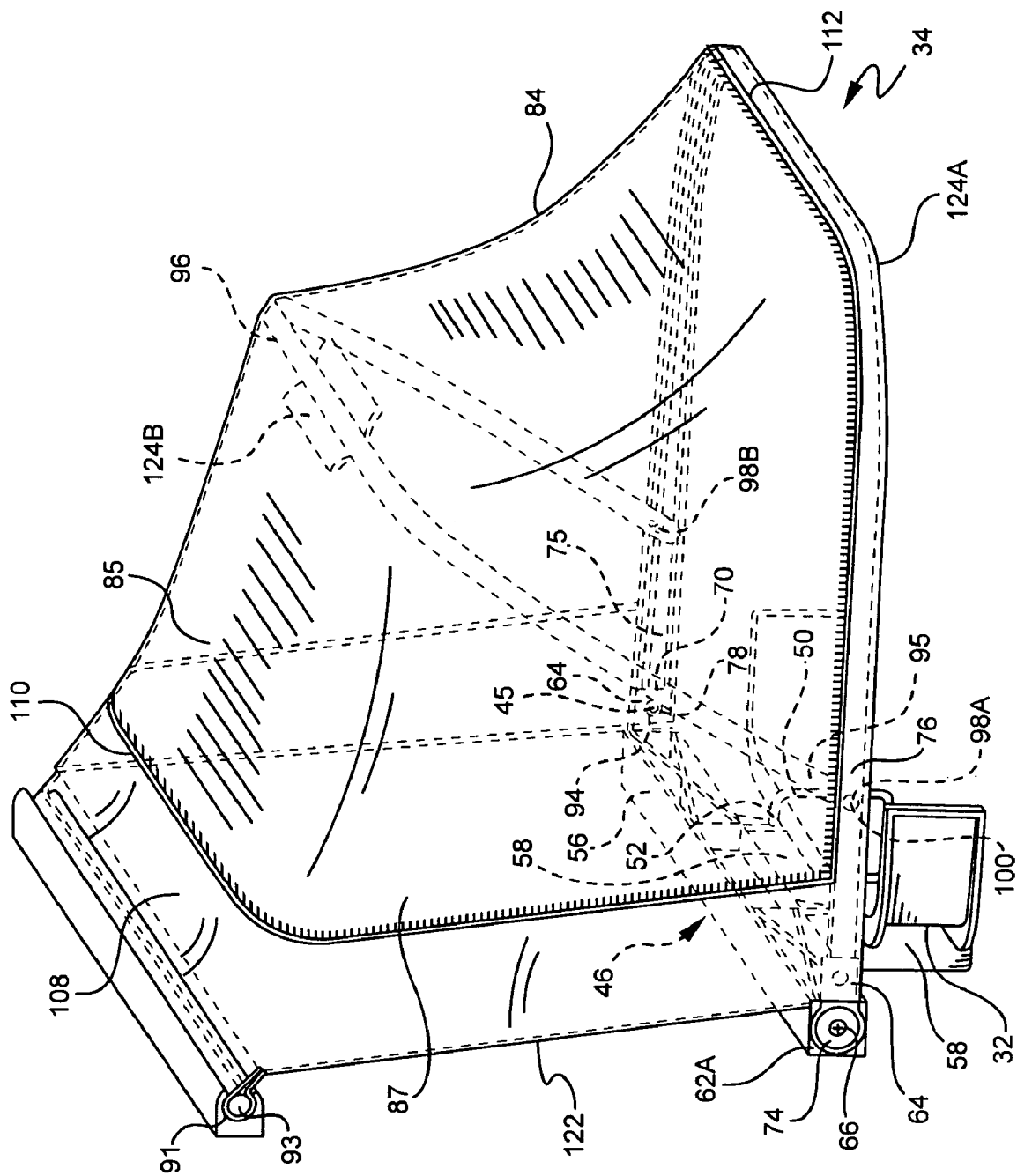
FIG. 4 is a side perspective view of the present invention, shown attached to the cart's bag support bracket to display an example attachment method without the cart present and with the cover extended.

FIGS. 2 and 2A show components that may be used and are shown for example purposes, used to mount an embodiment of this invention referred to as a canopy assembly 34, as shown in FIG. 3, to cart 10. A channel 40 is secured to a rear face 42 of top 12 preferably using rivets 44. However, screws, bolts or other fastening means could be used in place of rivets 44. A base member 46 is a structural bracket that is a fastening member attached to bag support 32 by U-bolts 50, as shown in FIGS. 2 and 4. The U-bolts surround the bag support and pass through holes 52 in flanges 58. It should be understood that other means for securing the base member to the golf cart could be used in place of using the U-bolts to attach the base member to the golf bag support bracket. As for example, the base member could be attached directly to the frame of the golf cart instead of the golf cart's golf bag support bracket using fasteners like a bolt and nut assembly. Base member 46 could also be replaced by two separate base members that each support one end of the canopy or other fastening members. The base member could be made into other geometric shapes, as for example a simple elongated member 46A, shown in FIG. 11, that is directly attached to frame extensions 38A and 38B by bolts 142. Other shapes would also work like a L-shaped cross section beam instead of an (-shaped cross section beam, a stamped metal member, etc. The base member could also be attached to other portions of the cart's frame. Therefore, the described base member 46 attached to bag support bracket 32 only illustrates a method of attaching this embodiment of the present invention.

The channel, shown in FIGS. 2 and 2A, is preferably one continuous piece of extruded aluminum, however, extrude plastic will also work. The channel has a substantially C-shaped cross section with a rearward opening 92. Alternatively, other engagement mechanisms like hook and loop fastening strips, snaps or other fastening means could be mounted to the top of the canopy and the back face of the cart top instead of the channel.

A canopy 84, shown in FIGS. 3 and 4, has a rolled and a sewn top edge 90 forming a sleeve 91 that a rod 93 is slid endwise into until the end of rod 93 corresponds to the ends of the sleeve forming rounded top edge 90. Rod 93 has a length about the same as the length of channel 40. The sleeve and rod are sized to allow them to be inserted as an assembly endwise into the C-shaped cross section of channel 40. Top edge 90 has a diameter larger than opening 92 in channel 40 preventing the top edge from passing through opening 92, therefore, securing the top edge within channel 40. Rod 93 may be constructed of a rigid material as for example plastic or metal. Alternatively, the rod could be eliminated and the top edge could be rolled and sewn to form a diameter larger than opening 92. Another alternative would be to not connect the top of the canopy to the top of the golf cart's top 12.

Figure 5:
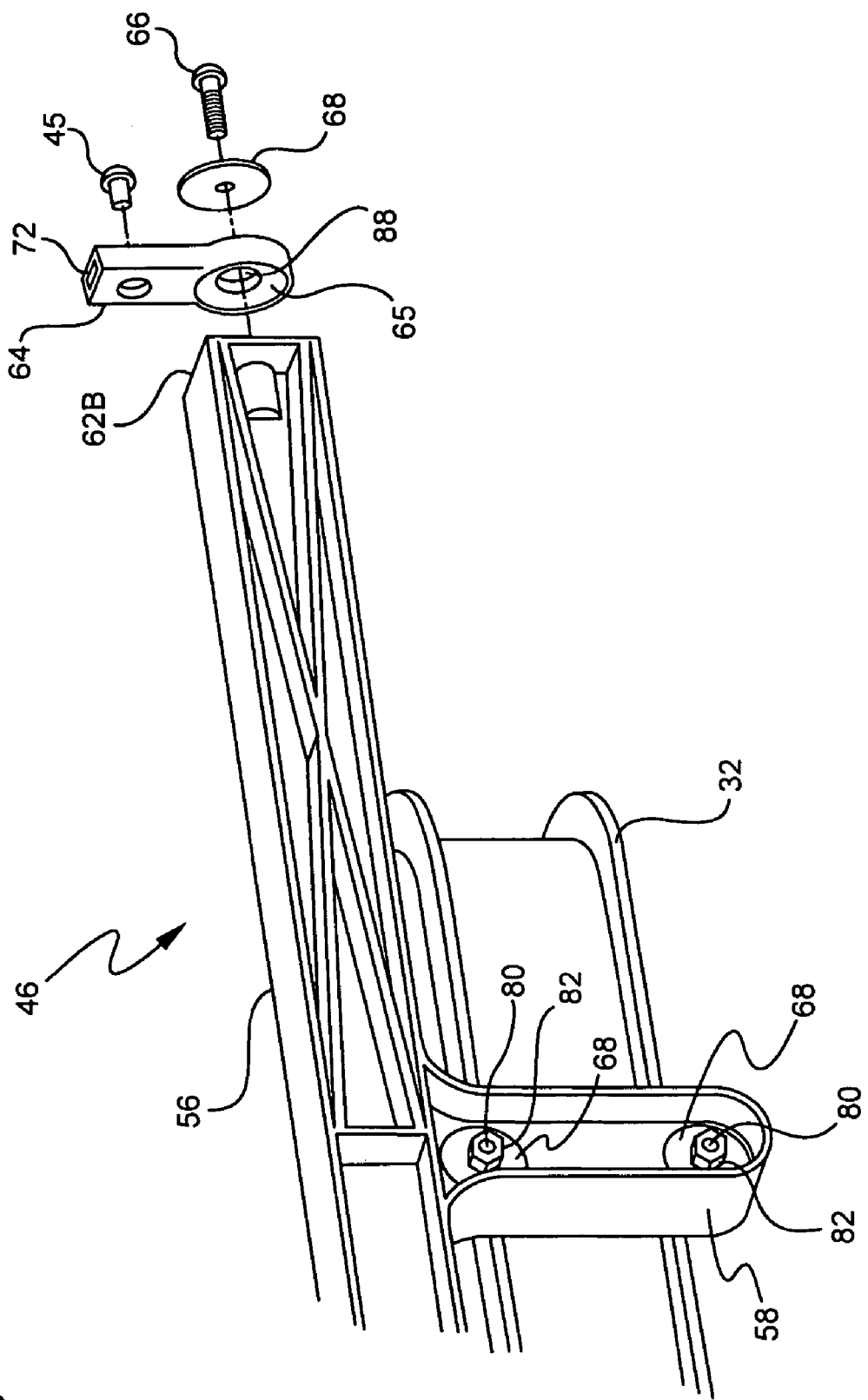
FIG. 5 is a partial rear perspective view of an example the base member, that may be used with the present invention, secured to the bag support with the pivot arm and associated hardware exploded the canopy and cart are eliminated from clarity.

As shown in FIGS. 4 and 5, U-bolts 50 are used to secure base member 46 to bag support 32 and are secured using washers 68 placed onto U-bolt ends 80 and threaded nuts 82 that thread onto ends 80 of the U-bolts. When the nuts are tightened, flanges 58 contact the back face of bag support 32 clamping them together. U-bolts 50 are preferably made from metal as for example steel. Alternatively, base member 46 could be mounted directly to the cart's frame instead of bag support 32 using the U-bolts or other types of fasteners, as for example standard threaded bolts with corresponding nuts.

Figure 11:
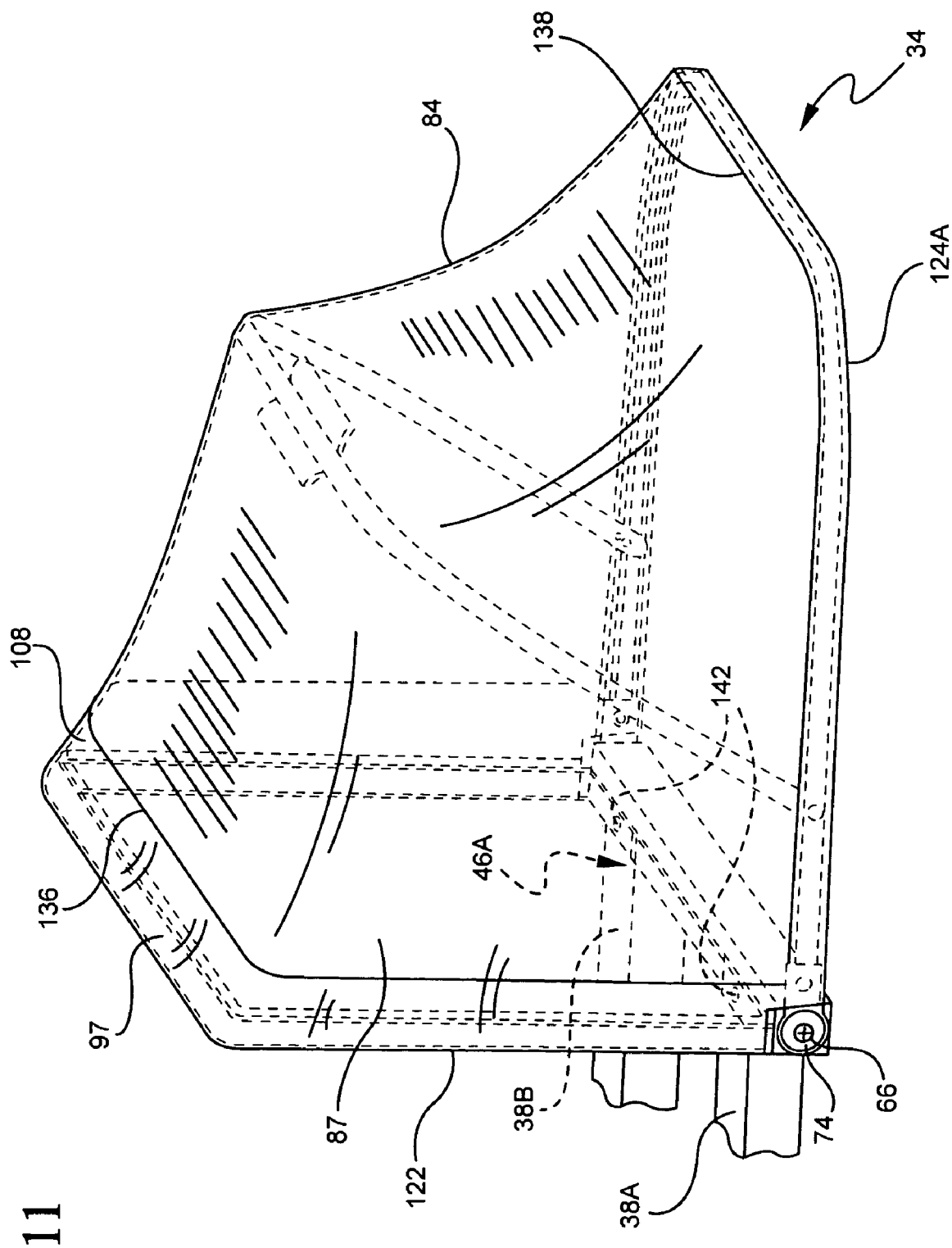
FIG. 11 is a side perspective view of the present invention illustrating how a tongue and groove mechanically interlocking strip could replace the zipper and further showing how the canopy of the present invention does not need to be attached to the rear of the golf cart top assembly.

With reference to FIGS. 5, 7 and 7A, base member 46 is preferably one continuous piece of high strength molded plastic, as for example nylon, with a beam 56 spanning the upper portion and two mounting flanges 58 extending from the bottom of the beam. The width of the beam corresponds to the width of the bag storage area. End faces 62A and 62B are located on opposite ends of beam 56. A cylindrical inner boss 60 extends from each end face 62A and 62B to form a mounting cylinder for a pivot arm 64, shown in FIG. 6A, to mount onto. A cylindrical outer ring 61 also extends off of end faces 62A and 62B surrounding inner boss 60. Both the inner boss and the outer ring are formed as part of base member 46. The outer ring provides a mating surface 63 that contacts a pivot face 65 on pivot arm 64 when the pivot arm is assembled onto inner boss 60 using a screw 66. The surface to surface contact between surface 63 and pivot face 65 creates constant contact during rotation of the pivot arm offering increased joint stability. Beam 56 has a generally I-beam shaped cross section that provides structural rigidity for the base member 46. Flanges 58 provide mounting extensions of the beam that contact the back face of bag support 32, as previously described. The flanges contain holes 52 that the ends of the U-bolts pass through. The flanges are formed as a continuous part of beam 56. The base member and associated components have been shown to describe and illustrate an example of components that may be used to mount the present invention. Alternatively, the beam could have other cross-sections and the flanges could be eliminated, with the beam directly fastening to the cart's bag support or frame. As for example, FIG. 11 illustrates elongated member 46A directly bolting to the cart's frame extensions 38A and 38B, replacing base member 46A.

With reference to FIGS. 6A, 7 and 7A, on each end of beam 56 are end faces 62A and 62B. Inner boss 60, formed as part of the base member, contains a small diameter screw bore 86 in the center of the boss. The bore has a diameter slightly smaller than the outside diameter of the threads on screw 66 and is sized to allow screw 66 to self-tap into the screw bore to secure pivot arm 64 onto inner boss 60 on each end of beam 56, as shown in FIG. 6. Washer 68 is used to distribute the clamp force of screw 66 on pivot arm 64 holding the pivot arm on the inner boss and keeping mating surface 63 in contact with the pivot face 65, shown in FIG. 5, on pivot arm 64. Alternatively, pivot arms 64 could be attached using rivets or other fastening methods that would still allow the pivotal attachment of pivot arms 64 to beam 56.

With reference to FIGS. 5, 6A and 7A, pivot arm 64 is a separately molded plastic part made from a high strength, molded plastic, as for example nylon. The pivot arm contains a pivot hole 88 that has a diameter that is slightly larger than the outside diameter of inner boss 60 allowing the pivot arm to rotate around the inner boss when the pivot arm is slid over the boss and secured in place by washer 68 and screw 66, as shown in FIG. M. Both the screw and the washer are preferably made of steel. Pivot arm 64 extends outward from a cylindrical mounting end 74 and transitions to a rectangular cross section receiving a end 70, shown in FIG. 6A, that has a hollowed rectangular socket 72, shown in FIG. 5, that is sized to receive a end 75 of a support bracket 76, as shown in FIG. 4. In this way, the pivot arms form a pivotal joint for support bracket 76 to attach to the base. The pivot arms have been shown and described to illustrate an example method of pivotally attaching support bracket 76 of the present invention to beam 56. Alternatively, the pivot arms could be eliminated and the ends of modified mid-support bracket 96 and support bracket 76 could be directly pivotally attached to beam 56 providing another means from pivotally attaching the frame structure formed by the support brackets to the base member.

With reference again to FIGS. 4 and 5, support bracket 76 is a member shown to illustrate one method that may be used to structurally support canopy 84 and is generally a U-shaped continuous rigid support with opposite ends 75 that have a rectangular cross section to facilitate insertion into socket 72. In this way, the support bracket is pivotally connected to base member 46. The length of support bracket 76 corresponds to the size of bag storage area 24 to ensure that when the support bracket is extended, it covers the majority of the bag storage area. Near the ends of the support bracket 76 are rivet holes 94 that align with clearance holes 78 in the pivot arms to allow the insertion of rivets 45. Rivets 45 secure ends 75 of support bracket 76 into sockets 72 and prevent the ends of the support bracket from coming out of sockets 72 because the rivets cannot slide through sockets 72. Alternatively, support bracket 76 could be made from several sections that are assembled together, as for example several molded sections that are fastened together. The support bracket could be pivotally attached using other methods, therefore, the described method is for illustration purposes of what could be used.

With reference again to FIG. 3, canopy 84 can be made from a thin sheet of flexible water-resistant material like vinyl that is sewn together. Canopy 84 is defined by a canopy top 85 and two generally opposing canopy sides 87 and 89. The canopy has a bottom portion with a bottom edge 120 having a lower zipper half 112, a top edge 90 and a front canopy edge 122 that define the limits of the canopy. Additionally, the canopy includes a flap 108. The flap can be made from a thin sheet of flexible water-resistant material like vinyl. The flap has a front and back boundary. The front boundary of the flap is sewn to the canopy, however, other means for attaching the flap to the canopy may be used. For example, the front boundary could be plastic welded or adhesive mounted to the canopy. Flap 108 has a upper zipper half 110 sewn to the flap's back boundary or bottom edge. The upper zipper half corresponds to the lower zipper half. The zipper halves may or may not be attached to each other on one end and may be made from metal or plastic. In this way, the lower zipper half and upper zipper half connect to form a releasable fastener. Flap 108 forms a layer on top of a portion of canopy top 85 and is sewn near or on the front edge of canopy 84.

It should be understood that the upper and lower zipper halves could be replaced by other types of releasable fasteners, as for example, snaps, mechanically interlocking plastic, hook and loop strips or grommet type button fasteners commonly called turn buckles.

With reference again to FIG. 4, support bracket 76 and a mid-support bracket 96 provide a frame structure for supporting the canopy. The mid-support bracket is generally an U-shaped continuous support with opposite ends 95 that have rectangular cross sections. However, the mid-support bracket could be made of several sections fastened together. The length of the mid-support bracket corresponds to the desired shape of the canopy that it supports. Both the support bracket and the mid-support bracket are made of a semi-rigid material like spring steel or a high strength plastic, as for example nylon. Both the support bracket and mid-support bracket pass through sewn channels 124A and 124B respectively in the canopy to locate them in the desired position within canopy 84. However, other coupling features could be used to connect the support brackets to the canopy. In this way, the canopy is attached to support bracket 76 and mid-support bracket 96. Support bracket 76 has pin holes 98A that align with pin holes 98B in mid-support bracket 96 to allow pins 100 to pass through, pivotally connecting the support bracket and mid-support bracket together.

Lock pins 102 are assembled onto the ends of pins 100 to secure the pins in position. In this way, the mid-support bracket is free to pivot about pins 100 relative to support bracket 76. Support bracket 76 and mid-support bracket 96 together makeup a frame structure for supporting the canopy. Alternatively, both the support bracket and the mid-support bracket could both pivotally attach to the ends of beam 56. Another alternative would be to modify the shown pivot arms so that both support bracket 76 and mid-support bracket 96 attach directly to the pivot arms that is pivotally attached to beam 56. Support bracket 76 and mid-support bracket 96 have been shown and described to illustrate how the present invention may be structurally supported, however, other methods may be employed.

With reference again to FIGS. 3 and 4, canopy assembly 34 is attached to cart 10 and is extended to protect golf bag 26 and golf clubs 28 from adverse weather conditions like rainfall. In the extended position shown, canopy 84 is pulled taunt from within channel 40 and stretches over mid-support bracket 96 and down over support bracket 76. Therefore, channel 40, mid-support bracket 96 and support bracket 76 cooperate to support canopy 84. In this way, canopy 84 covers bag storage area 24 and remains in this position due to the weight of the canopy, support bracket 76 and mid-support bracket 96. Alternatively, a front support bracket could be added to support canopy top edge 90 replacing channel 40. In this way, the canopy would not have to attach to the golf cart's top.

Figure 8:
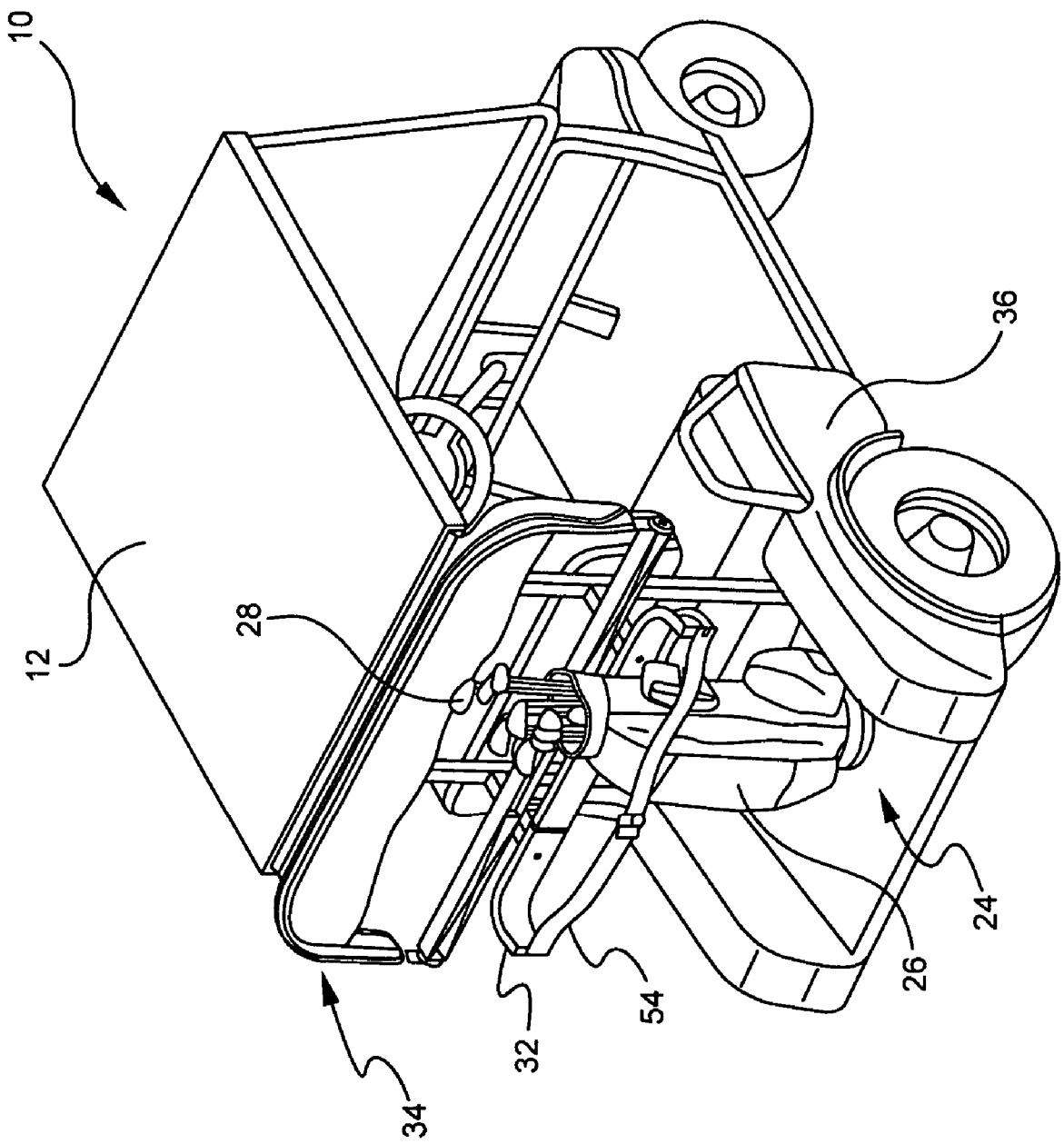
FIG. 8 is a perspective view of the cart with the present invention attached and the canopy folded up to allow access to the golf clubs.

With reference to FIG. 8, canopy assembly 34 is attached to cart 10 and is in a folded up position to allow access to golf bag 26 and golf clubs 28. Canopy 84 is folded up from the extended position, as shown in FIG. 4, by gripping the bottom of canopy 84 near support bracket 76 and lifting the support bracket upwardly, toward the back of top 12. The moment force created from this lifting action causes pivot arms 64 to rotate around inner bosses 60. The mid-support bracket pivots relative to support bracket 76 around pins 100. At approximately the halfway point of folding up, the canopy support bracket 76 contacts mid-support bracket 96 with the cover material folded in-between them and begins to rotate upwardly toward the back of top 12. When the lifting action is completed, both support bracket 76 and mid-support bracket 96 are substantially vertical and the canopy is slipped under outer flap 108. Lower zipper half 112 is connected with upper zipper half 110, preventing the canopy from folding back out in the extended position and neatly sandwiching the canopy under the protective flap. Therefore, the canopy is held in the folded position, as shown in FIG. 8, by the mechanical connection of the upper and lower zipper halves. In the folded up position, the canopy is protected from weathering elements and from wear and tear due to golf course obstacles like tree branches and bushes. The player may extend the canopy by unzipping the upper and lower zipper halves and pulling the bottom of canopy 84 near support bracket 76 downwardly and toward the back of the cart. This will extend the cover over bag storage area 24, as shown in FIG. 3.

Figure 9:
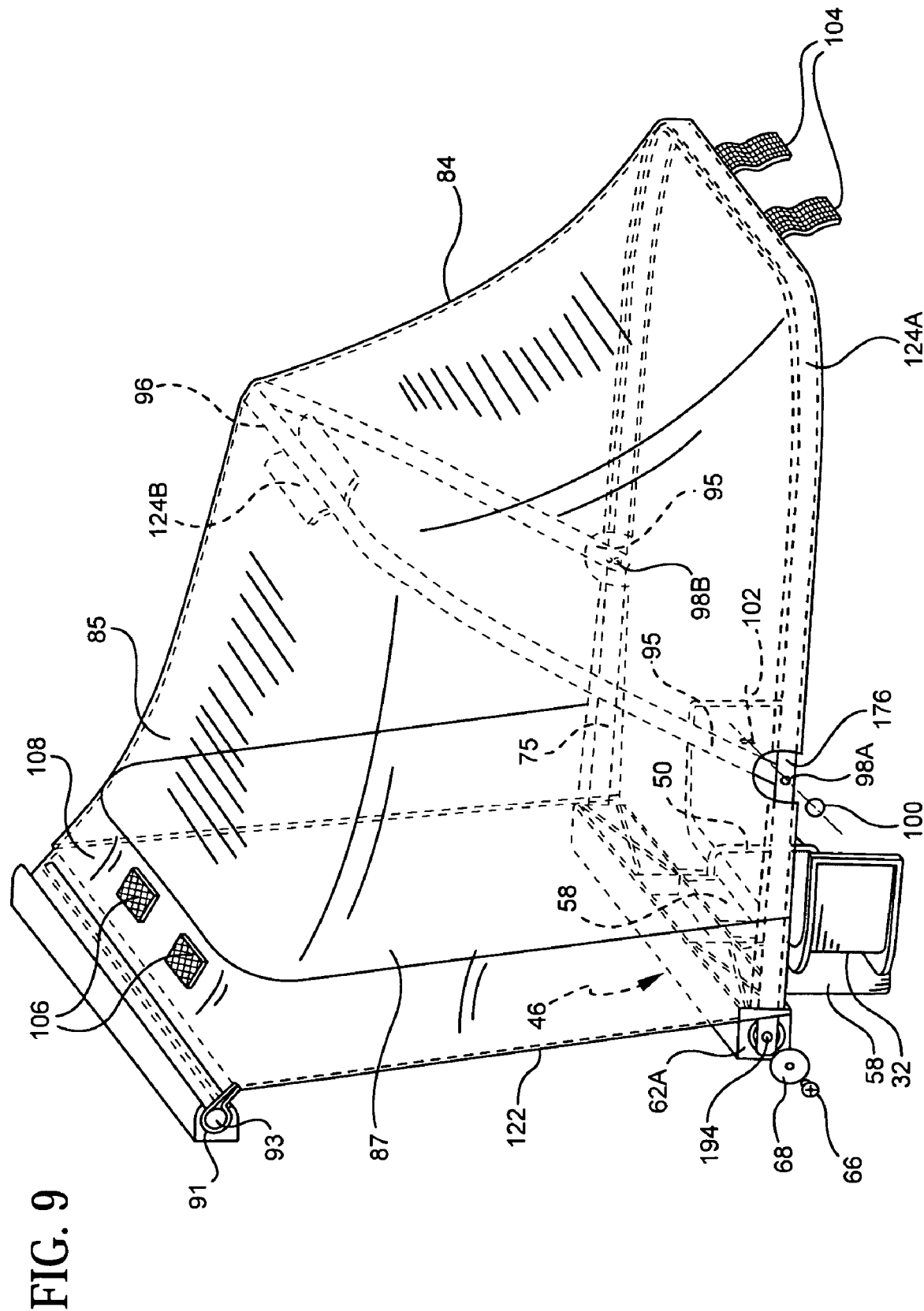
FIG. 9 is a side perspective view of the present invention having hook and loop connection means.

It should be understood that the pivotal attachment of the support brackets for the canopy could be made in a variety of ways. For example, in FIG. 9 pivot arms 64 and rivet holes 94, shown in the original embodiment, are eliminated. Pivot holes 194 are assembled directly onto inner boss 60. A modified support bracket 176 is pivotally attached directly to base member 46 in the same way as pivot arms 64, as previously described. Additionally, the upper and lower zipper halves, previously described in this invention, could be replaced by other types of mechanically connecting fasteners. For example, the upper and lower zipper halves, previously described, have been eliminated in FIG. 9. Instead, hook straps 104 that are attached to the bottom edge of the canopy can be fastened to loop patches 106 that are attached to the outside surface of flap 108 when the canopy is folded up. In this way, the canopy is kept in the folded position by the straps.

Figure 10:
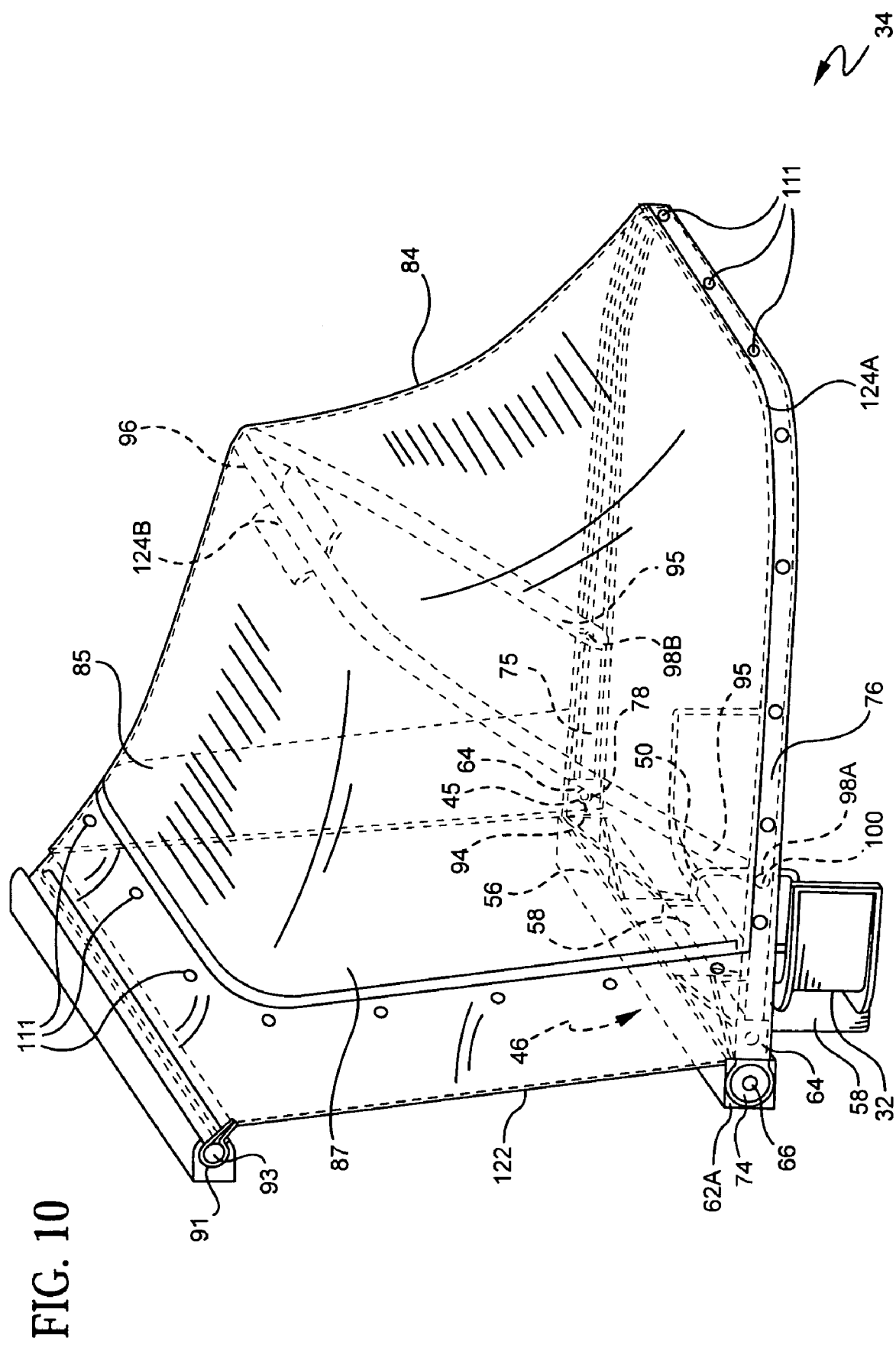
FIG. 10 is a side perspective view of the present invention with snaps replacing the zipper.

Another example of how the upper and lower zipper halves, shown in FIG. 3, could be replaced by another fastener is shown in FIG. 10. The upper and lower zipper halves have been replaced with a plurality of snaps 111. The snap could be made from either metal or plastic. It should also be understood that other fastening methods could be employed instead of the snaps or hook and loop fastening strips.

Another example of how the upper and lower zipper halves, shown in FIG. 3, could be replaced by another fastener is shown in FIG. 11. A tongue 136 and a groove 138 fastening strip replace the zippers, providing for another type of releasable fastener. Tongue 136 can be connected to groove 138 when the canopy is folded up. The tongue and the groove can be made from flexible plastic or rubber. In addition, top edge 90 of the present invention need not be attached to rear edge 13 of cart top 12. The canopy could be attached to a upper support bracket 97, shown in FIG. 11 instead of attaching to rear edge 13 of golf cart top 12. Upper support bracket 97 can be connected to elongated member 46A using bolts 142 that pass through frame extensions 38A and 38B of the golf cart. The upper support bracket could be made from metal or strong plastic like a glass or mineral filled polymer. This type of frame structure could be used on the present invention if the designer does not want to connect to the golf cart top.

Figure 12:
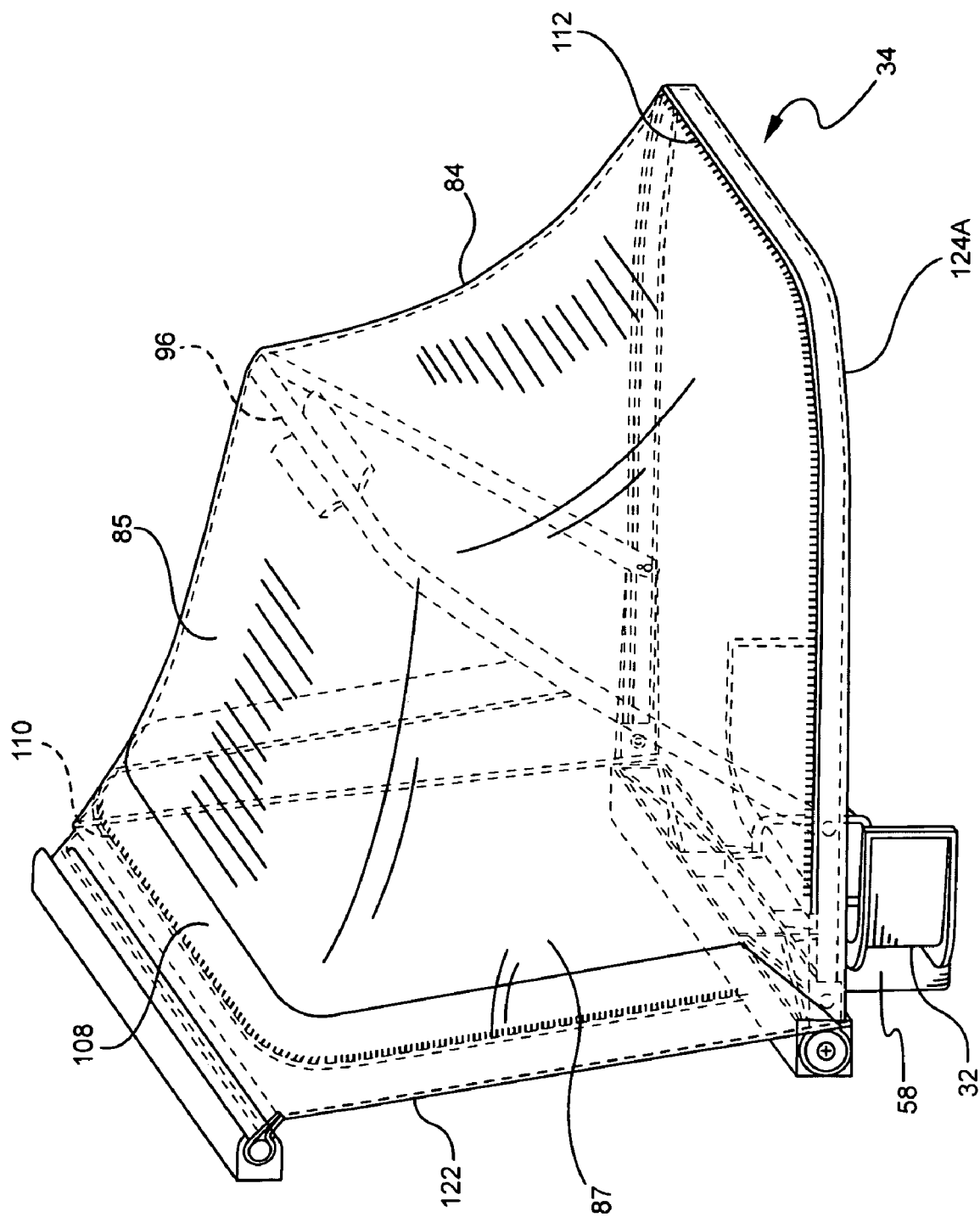
FIG. 12 is a side perspective view of a first alternate embodiment of the present invention having the upper zipper half sewn underneath the flap onto the top of the canopy.

In a first alternative embodiment of the present invention, as shown in FIG. 12, upper zipper half 110 is sewn or otherwise attached to canopy top 85 under flap 108. When the canopy is folded up, lower zipper half 112 is connected to upper zipper half 110 with flap 108 covering the folded up canopy, protecting it from weathering elements. It should be understood that other fastening methods could be employed instead of the zipper, as for example snaps, hook and loop fastening strips, tongue and groove fastening strips and other types of mechanically interlocking plastic fasteners.

Figure 13:
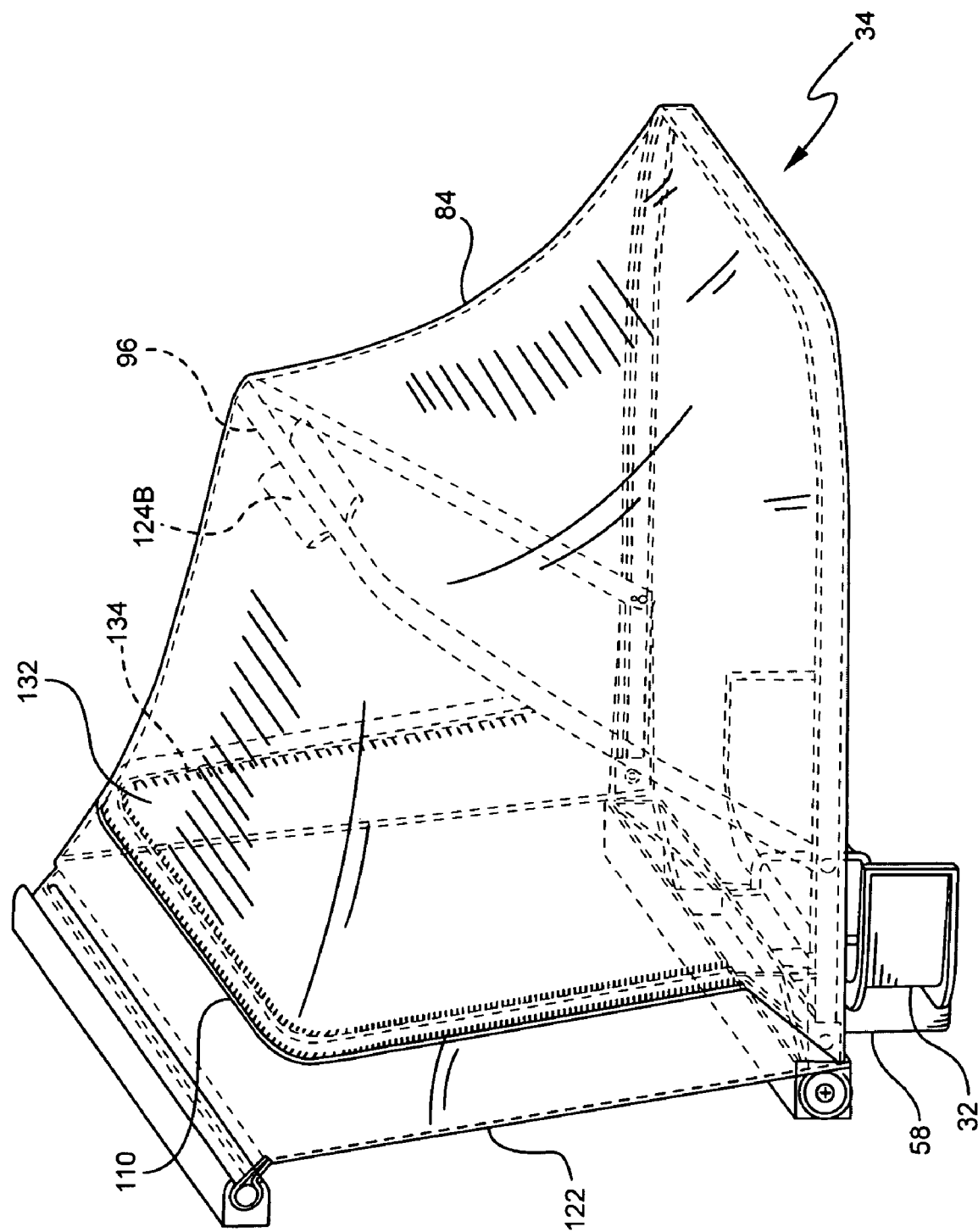
FIG. 13 is a side perspective view of a second alternate embodiment of the present invention having an inner flap with a zipper half that zips to an outer flap that has a corresponding zipper half.

In a second alternative embodiment of the present invention, as shown in FIG. 13, flap 108 and upper zipper half 110 have a corresponding inner flap 132 and an inner zipper half 134. When the canopy is folded up, the inner flap can be connected to outer flap 108 by connecting upper zipper half 110 to corresponding inner zipper half 134. When zipped together, the flaps form a protective pocket that the canopy is protected within. It should be understood that other fastening methods could be employed instead of the zipper, as for example snaps, hook and loop fastening strips, tongue and groove fastening strips and other types of mechanically interlocking plastic fasteners.

Figure 14:
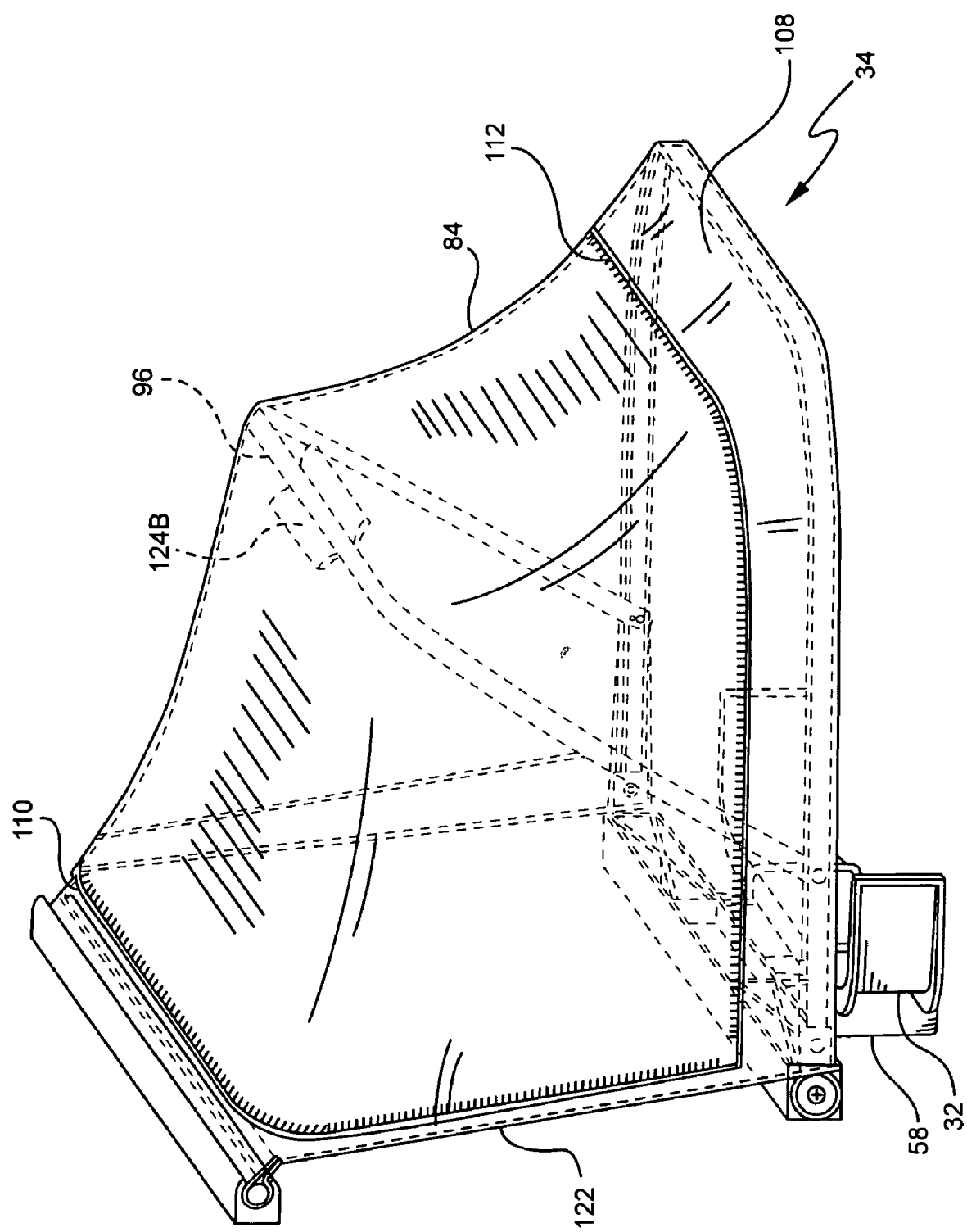
FIG. 14 is a side perspective view of a third alternate embodiment of the present invention with the upper half of the zipper sewn substantially on the top edge of the canopy and a flap attached to the bottom portion of the canopy.

In a third alternative embodiment of the present invention, as shown in FIG. 14, flap 108 has been moved to the bottom of the canopy as shown. The back boundary of the flap is sewn or otherwise attached to the canopy. In this embodiment, lower zipper half 112 is sewn substantially onto the front boundary of flap 108 and the upper zipper half 110 is sewn or otherwise attached substantially on the top front edge of the canopy. Therefore, the zipper halves are approximately located at the described locations. It should be understood that other fastening methods could be employed instead of the zipper, as for example snaps, hook and loop fastening strips, tongue and groove fastening strips and other types of mechanically interlocking plastic fasteners. When the canopy is folded up, flap 108 covers over the top of the folded canopy, protecting it from weathering elements.

Figure 15:
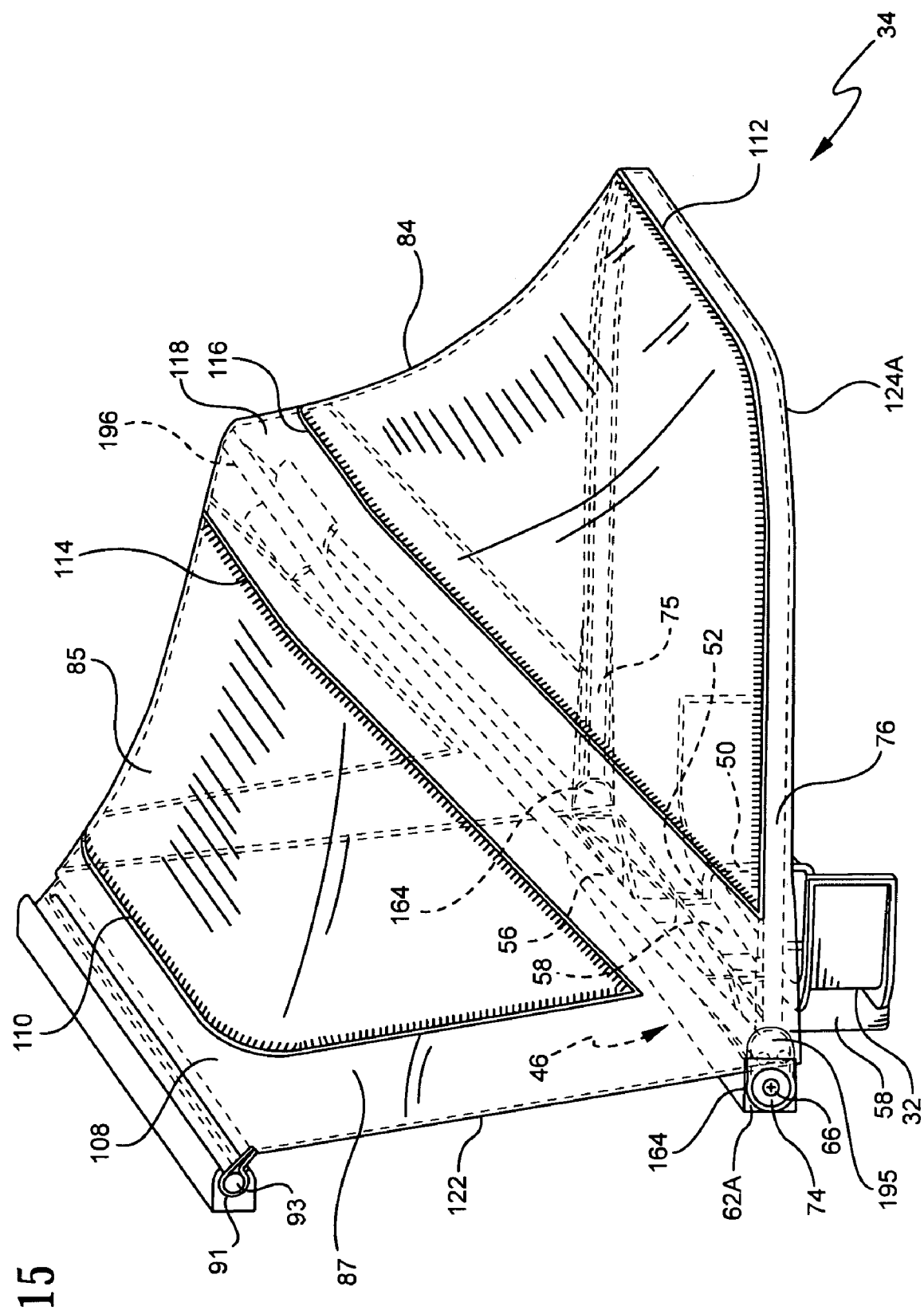
FIG. 15 is a side perspective view of a fourth alternate embodiment of the present invention having two additional zippers.

In a fourth alternative embodiment of the present invention, as shown in FIG. 15, an upper middle zipper half 114 is sewn to the canopy substantially on the middle. A lower middle zipper half 116 is sewn to the bottom edge of a lower middle flap 118. In this embodiment, the canopy can be retained in a folded-up position by connecting upper zipper half 110 to upper middle zipper half 114 and lower middle zipper half 116 to the lower zipper half 112. Canopy top 85 folds under flap 108 and the lower portion of canopy folds under lower middle flap 118, protecting the canopy from weathering elements. This embodiment is shown as an example illustration of another method that may be used with present invention. A modified mid-support bracket 196 attached to modified pivot arms 164 that pivotally attach to base member 46. In this way, both the modified mid-support bracket and the support bracket are pivotally attached to modified pivot arms 164. It should be understood that other fastening methods could be employed instead of the zipper, as for example snaps, hook and loop fastening strips, tongue and groove fastening strips and other types of mechanically interlocking fasteners.

Figure 16:
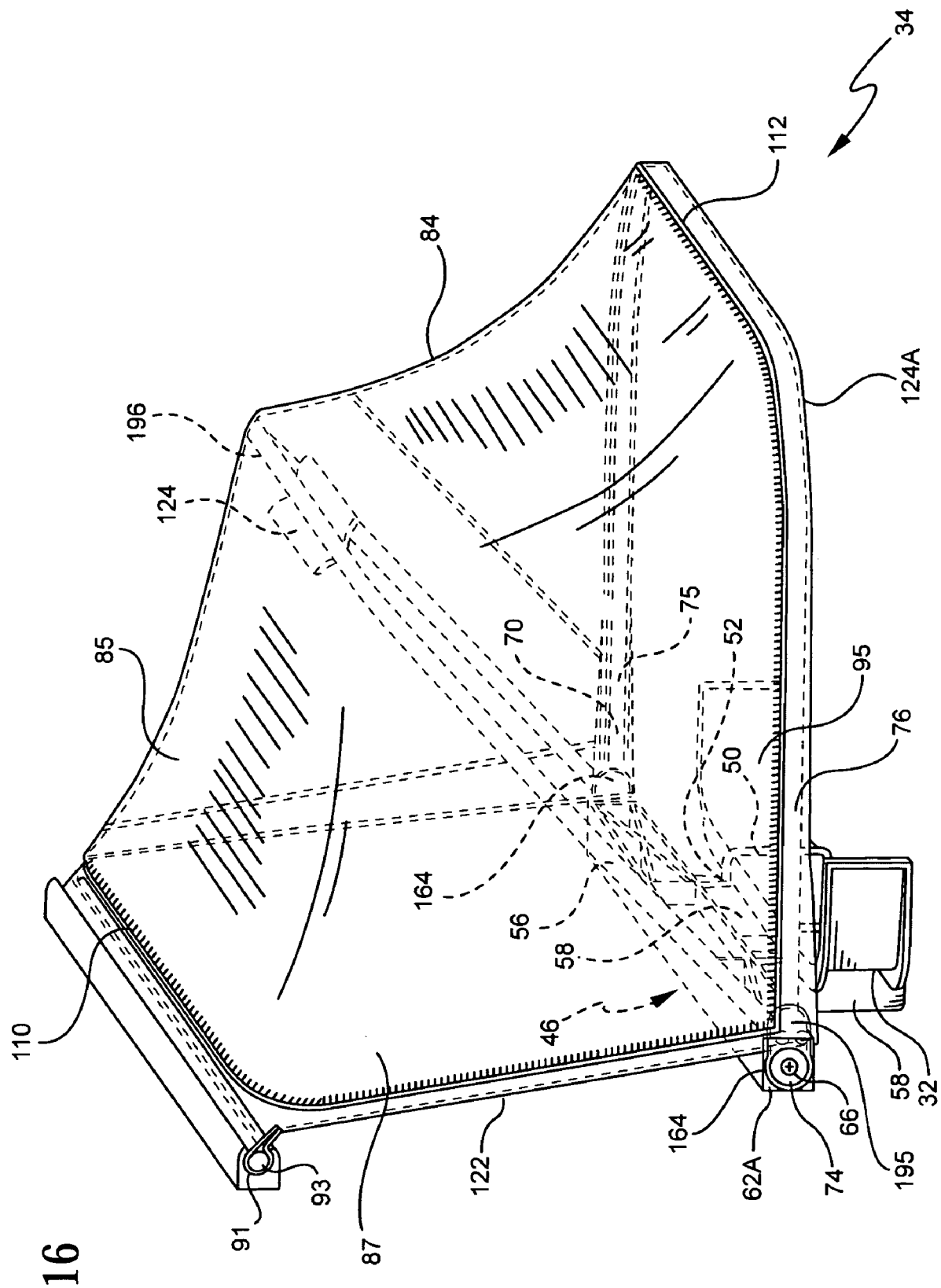
FIG. 16 is a side perspective view of a fifth alternate embodiment of the present invention without the protective flap.

In a fifth alternative embodiment of the present invention, as shown in FIG. 16, upper zipper half 110 is sewn onto the upper portion of the canopy top. Flap 108, included in the original preferred embodiment, has been eliminated. When the canopy is folded up, the upper zipper half is attached to the corresponding lower zipper half 112. In this way, the canopy is retained in the folded up position. The canopy is protected from weathering elements because it is folded under the connected upper and lower zipper halves. In addition, this fifth alternative embodiment is shown with modified mid-support bracket 196 and support bracket 76, each supporting the canopy are attached to modified pivot arm 164 on the ends of beam 56. It should be understood that other fastening methods could be employed instead of the zipper, as for example snaps, hook and loop fastening strips, tongue and groove fastening strips and other types of mechanically interlocking plastic fasteners.

Figure 17:
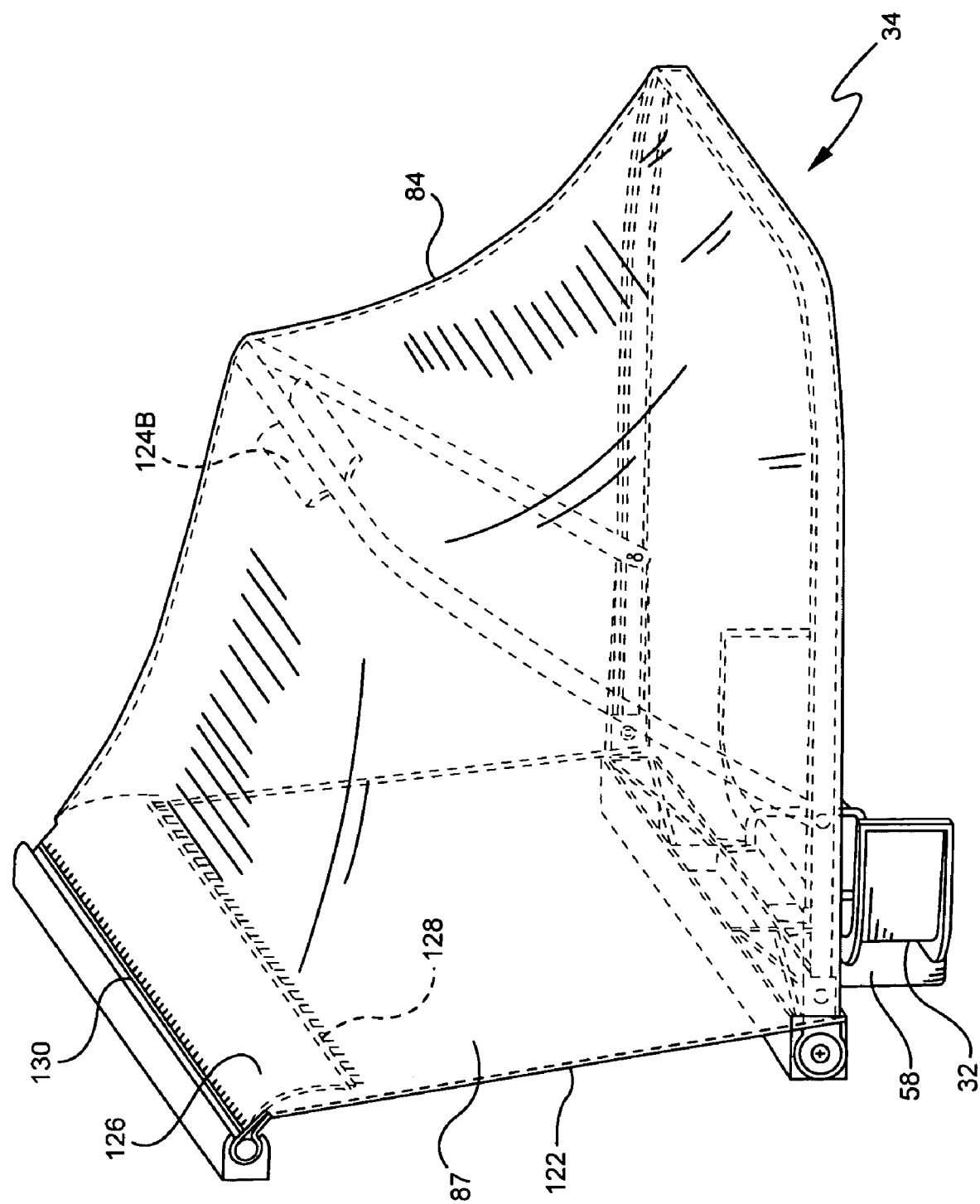
FIG. 17 is a side perspective view of a sixth alternate embodiment of the present invention having a top flap sewn to the underside of the canopy and a zipper for securing the canopy in a folded up position.

In a sixth alternative embodiment of the present invention, as shown in FIG. 17, a top flap 126 is located under canopy top 85 and is attached at its front boundary to the underside of the canopy. A lower flap zipper half 128 is sewn or otherwise attached to the back boundary of top flap 126. An upper flap zipper half 130 is sewn or otherwise attached to the outside of canopy top 85 substantially on the front edge. When the canopy is folded up, the upper flap zipper and lower flap zipper halves are connected with the top flap surrounding the top portion of the folded canopy, protecting it from weathering elements. It should be understood that other fastening methods could be employed instead of the zipper, as for example snaps, hook and loop fastening strips, tongue and groove fastening strips and other types of mechanically interlocking plastic fasteners.

Accordingly, one skilled in the art will recognize that the canopy rain cover of this invention can be used for rain protection on a motorized golf cart easily and conveniently and has an improved releasable fastener for retaining the canopy in the folded up position. In addition, the preferred embodiment of the invention has a protective flap to protect the folded canopy from weathering elements.

Although the description above of a canopy assembly for a golf cart contains many specificities, these should not be construed as limiting the scope of the invention, but as merely providing illustrations of some of the presently preferred embodiments of this invention. For example, the plastic molded base member 46 could be replaced with a steel or wood base member; the base member could have a different shape or be made of an assembly of different parts; the U-bolts used to mount the base member to the bag support could be replaced with another fastening means like a threaded nut and bolt passing through the bag support or the frame of the cart; screw 66 fastening pivot arms 64 onto inner boss 60 could be replaced by snap fitting pivot hole 88 over a corresponding inner boss; one pivot arm 64 could be removed by only attaching one end of support bracket 76 to base member 46; pivot arm socket 72 could be eliminated with bracket 76 attaching another way to the pivot arm; both the support bracket and the mid-support bracket do not have to pass through sewn channels in the canopy, they could be attached using other fastening means like hook and loop straps; channel 40 could be replaced by another type of fastening means to connect the canopy's top edge to top 12, and sleeve rod 93 could be eliminated by rolling and sewing top edge 90, etc.

Figure 18:
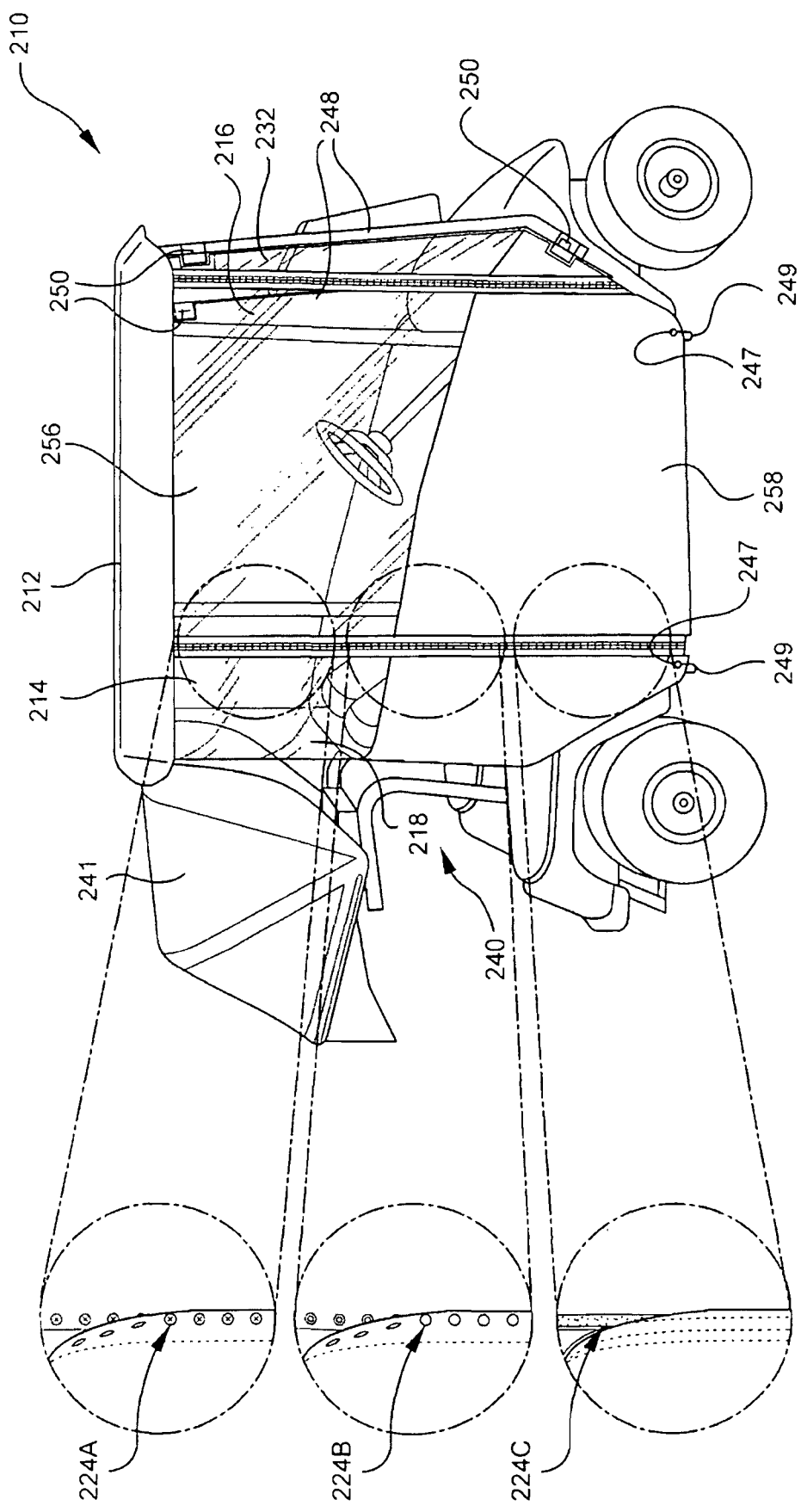
FIG. 18 shows a side view of a golf cart incorporating the golf cart cover in accordance with the present invention, in which flaps of the cover are rolled down for protection from the elements.

The present invention further relates to a cover assembly, which may be adapted to cover the passenger compartment of a golf cart. FIG. 18 shows a side view of a motorized golf cart or car viewed from the passenger's side or right side, over which a golf cart cover 210 in accordance with the present invention has been fit. The cover 210 preferably includes a top surface 212, left flap 214 (on driver's side), right flap 216 (on passenger's side), and rear flap 218. All flaps are shown in a rolled down position in FIG. 18.

The cover 210 may be used on any type of golf cart including a seating compartment and a support frame, on which the cover 210 can be supported. Typically, the support frame includes vertical members and a top frame surface supported by the vertical members, which extends over the seating compartment and preferably over a storage compartment at the rear of the golf cart. Once initially installed for use, therefore, the cover 210 can be set to enclose the interior of the golf cart in order to protect both passengers and objects in the golf cart from wind, rain, and other undesirable environmental elements. When it is desired to use the golf cart without any restrictive enclosures, the cover 210 may be used as an integrated storage unit for removing from view and storing all or a portion of the cover 210.

Figure 19:
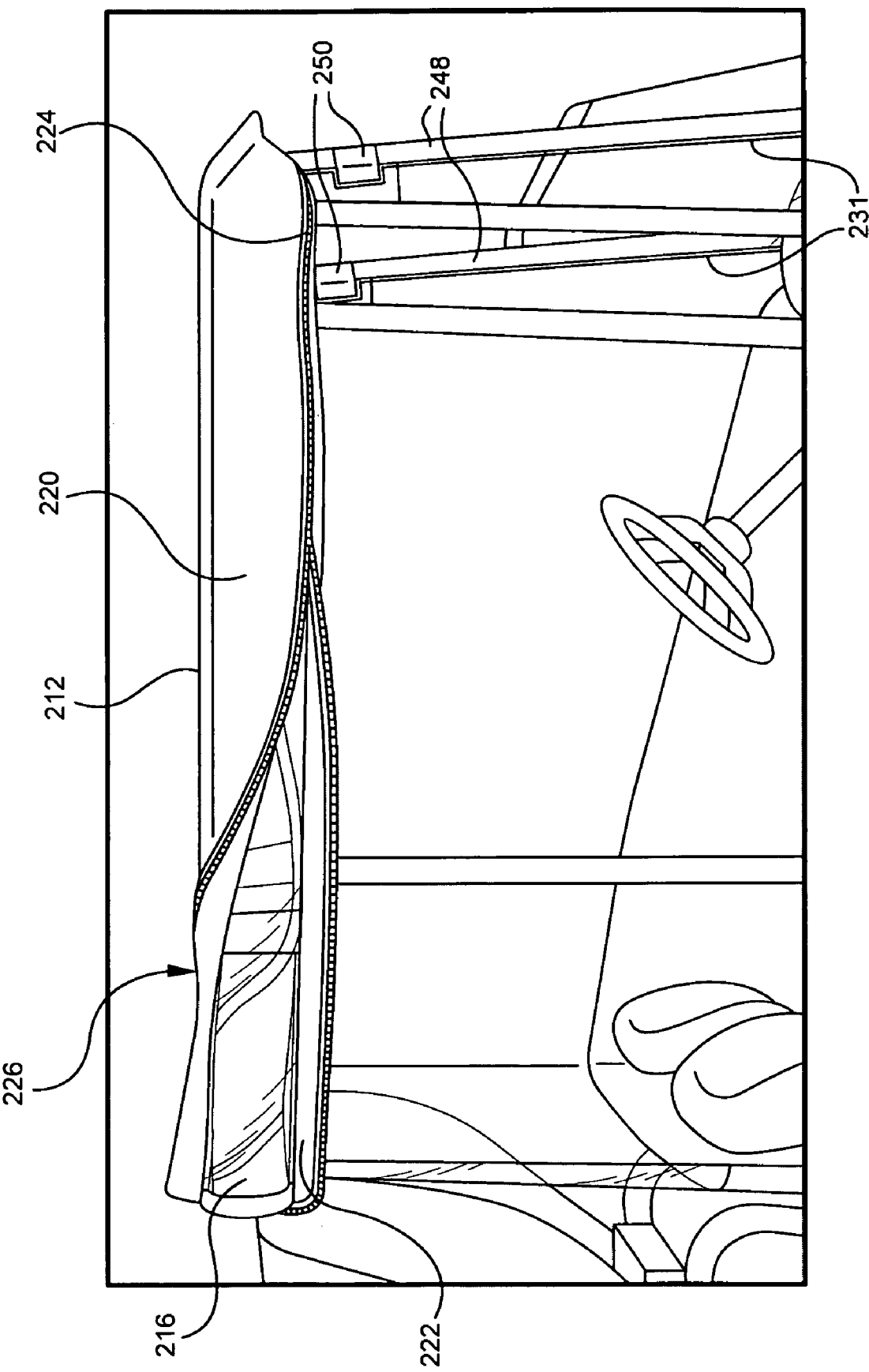
FIG. 19 shows a side close-up view of the golf cart cover with the right flap rolled up and enclosed within the boot, which is only partially zippered to reveal the enclosed rolled up flap.

The right flap 216 is shown in a rolled-up position in FIG. 19 for storage on the golf cart in accordance with the present invention. The cover 210 preferably includes an upper boot flap 220 and a lower boot flap 222, either or both of which are attached to the top surface 212 along an edge (and preferably incorporate a zipper 224, or other fastening device, such as buttons 224A, snaps 224B, hook-and-loop fastenings 224C shown in FIG. 18, and the like) or made as part of the top surface 212. The lower boot flap 222 may be part of the top surface 212 or a separate element attached to the top surface 212. When the right flap 216 is rolled up to the roofline, the upper and lower storage boot flaps 220, 222 can be closed around the rolled flap 216 and fastened shut to form an integrated storage boot or boot enclosure 226 to fully enclose and protect the rolled flap. The boot 226 is shown partially zippered in FIG. 19 to reveal the rolled-up flap 216 enclosed therein. In the fully enclosed boot 226, the rolled flap is protected from rain, sun, wind, debris, and other obstacles, such as tree branches and bushes. The zipper 224 may be replaced with other known fasteners, such as buttons, snaps, hook-and-loop fastening strips, and the like to mechanically close the upper 220 and lower 222 boot flaps around the flap.

Figure 20:
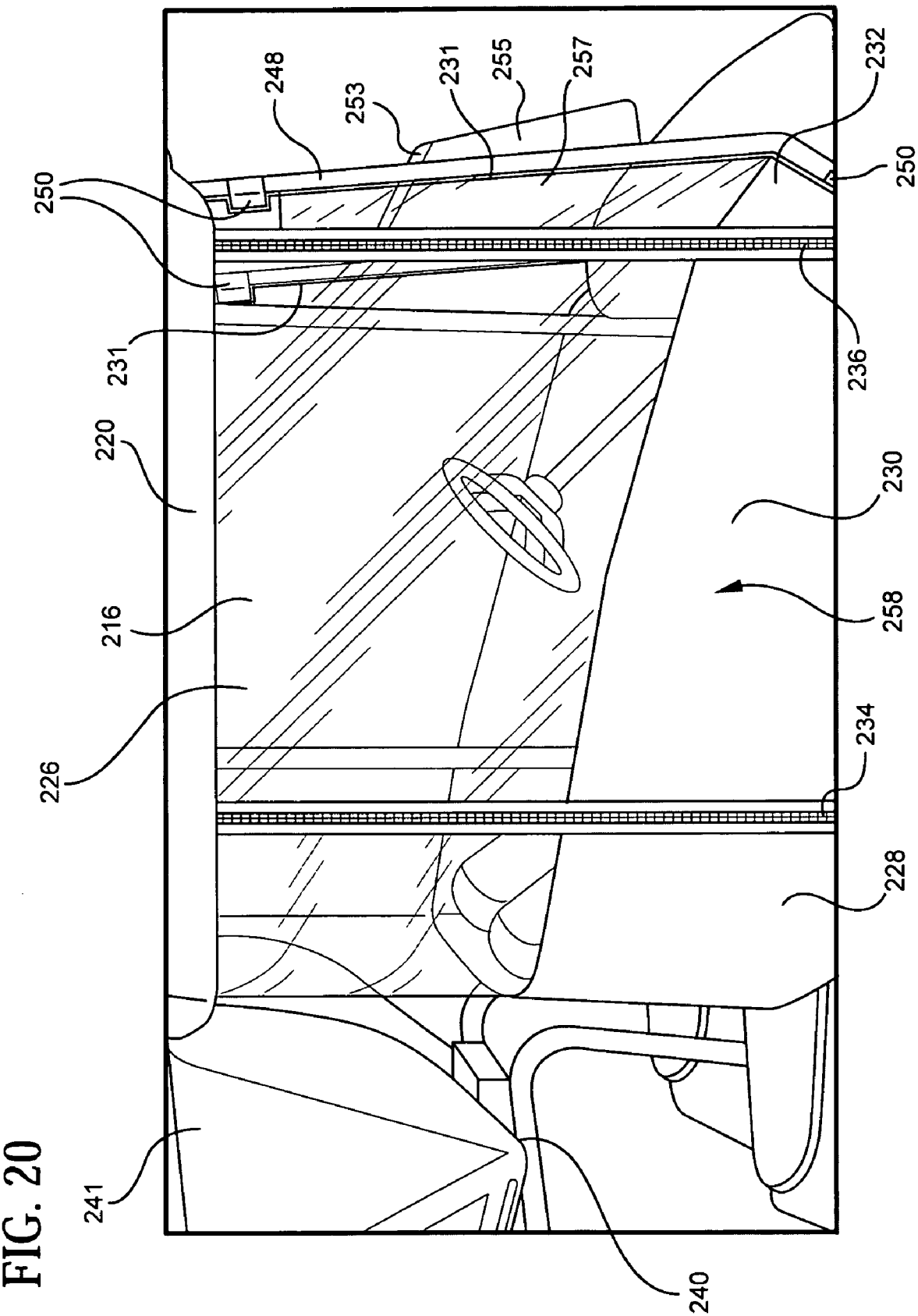
FIG. 20 shows a side close-up view of the golf cart cover with the right flap rolled down and the upper boot flap covering the right flap.
Figure 21:
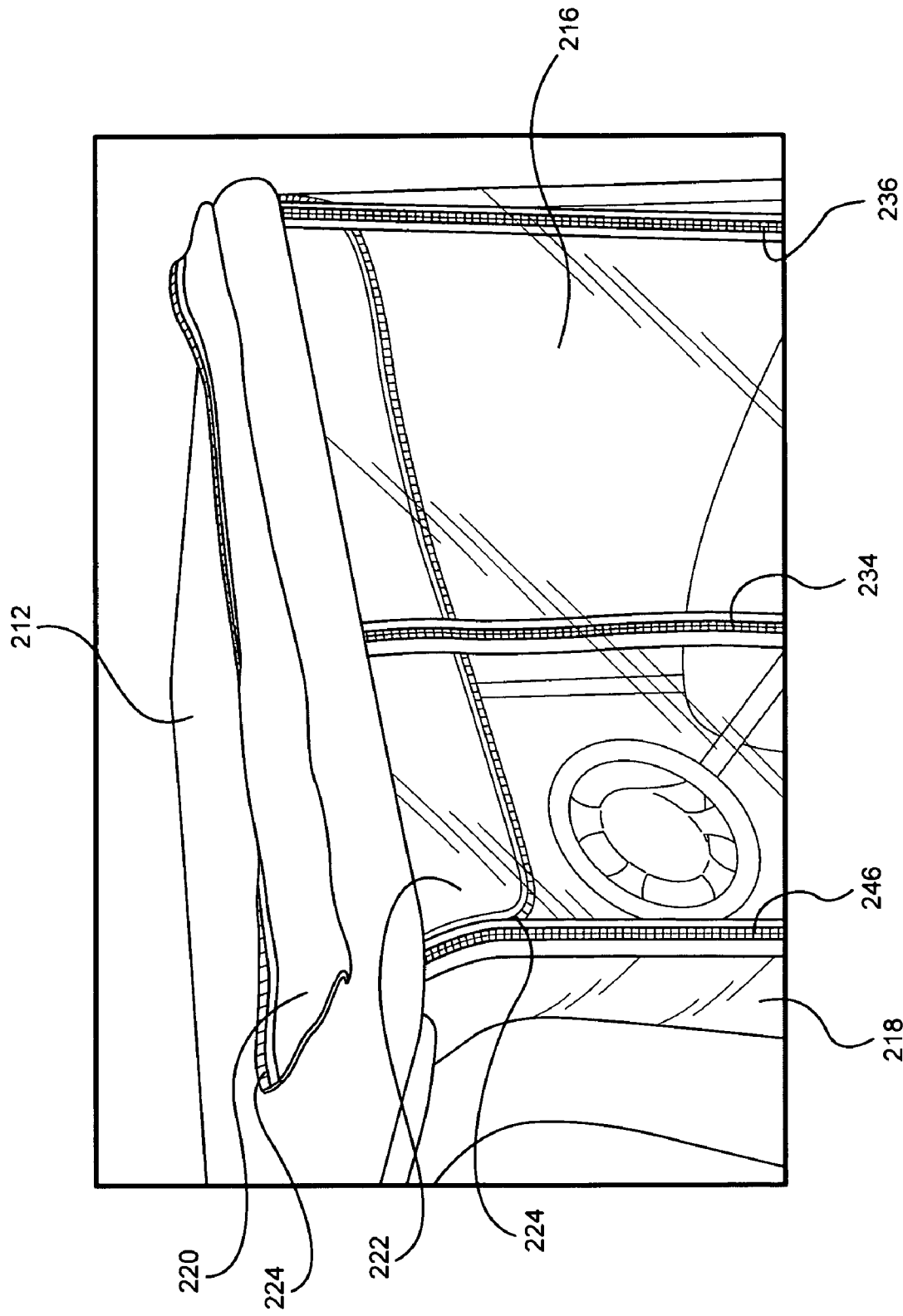
FIG. 21 shows an oblique rear close-up view of the golf cart cover with the right flap rolled down and an upper boot flap folded back over a top surface of the cover.

Referring to FIGS. 20 and 21, the upper boot flap 220 also serves to protect the attachment points of the flap, if any, for example, when the flap(s) are in the rolled-down position, while providing an aesthetically pleasing addition to the roofline. The golf cart cover 210 preferably also includes upper and lower boot flaps that are adapted to enclose the left flap 214 shown in FIG. 18 in a substantially similar manner to that described in relation to the right flap 216. In addition, the cover may include upper and lower boot flaps adapted to enclose the rear flap 218 and a front flap (not shown) while remaining within the scope of the present invention.

Referring still to FIGS. 20 and 21, the right flap 216 preferably includes a rear portion 228, a central portion 230, and a front portion 232. Zippers 234, 236, or other suitable fasteners, such as buttons, snaps, hook-and-loop fastening strips, and the like, preferably connect the central portion 230 with each of the rear portion 228 and the front portion 232. The zippers 234, 236 are preferably suitably placed to allow easy and rapid access for passengers entering and exiting the golf cart when the right flap 216 is rolled down, as well as to optimize visibility for the driver and passengers. Preferably, the left flap 214 includes a similar arrangement of panels and fastening strips or fasteners. Hook and/or bungee cords 249 shown in FIG. 18 may be attached to reinforced apertures or grommets 247 to further retain portions of the flaps 214, 218, 216, and front flap to the golf cart.

The rear flap 218 may include zipper(s) or other fastening means, either vertically or horizontally oriented, to separate the rear flap 218 into additional portions for easy access to the storage compartment located at the rear interior of the golf cart. In one embodiment, the rear flap 218 may include two vertically-oriented portions: a left rear portion and a right rear portion, which are joined in the center of the rear flap 218 facing the golf bag compartment 240, as shown in FIGS. 18 and 20.

In the same fashion described above for the right flap 216 and left flap 214, zippers 246 or other suitable fasteners may join and seal the rear flap 218 to the left 214 and right 216 flaps when in the rolled-down position. The cover 210 may also be used in conjunction with a rear compartment canopy cover 241 disclosed in further detail in co-owned U.S. application Ser. No. 10/863,797 and Design Patent D 497,587, issued Oct. 26, 2004, which are incorporated herein by reference in their entirety.

Figure 22:
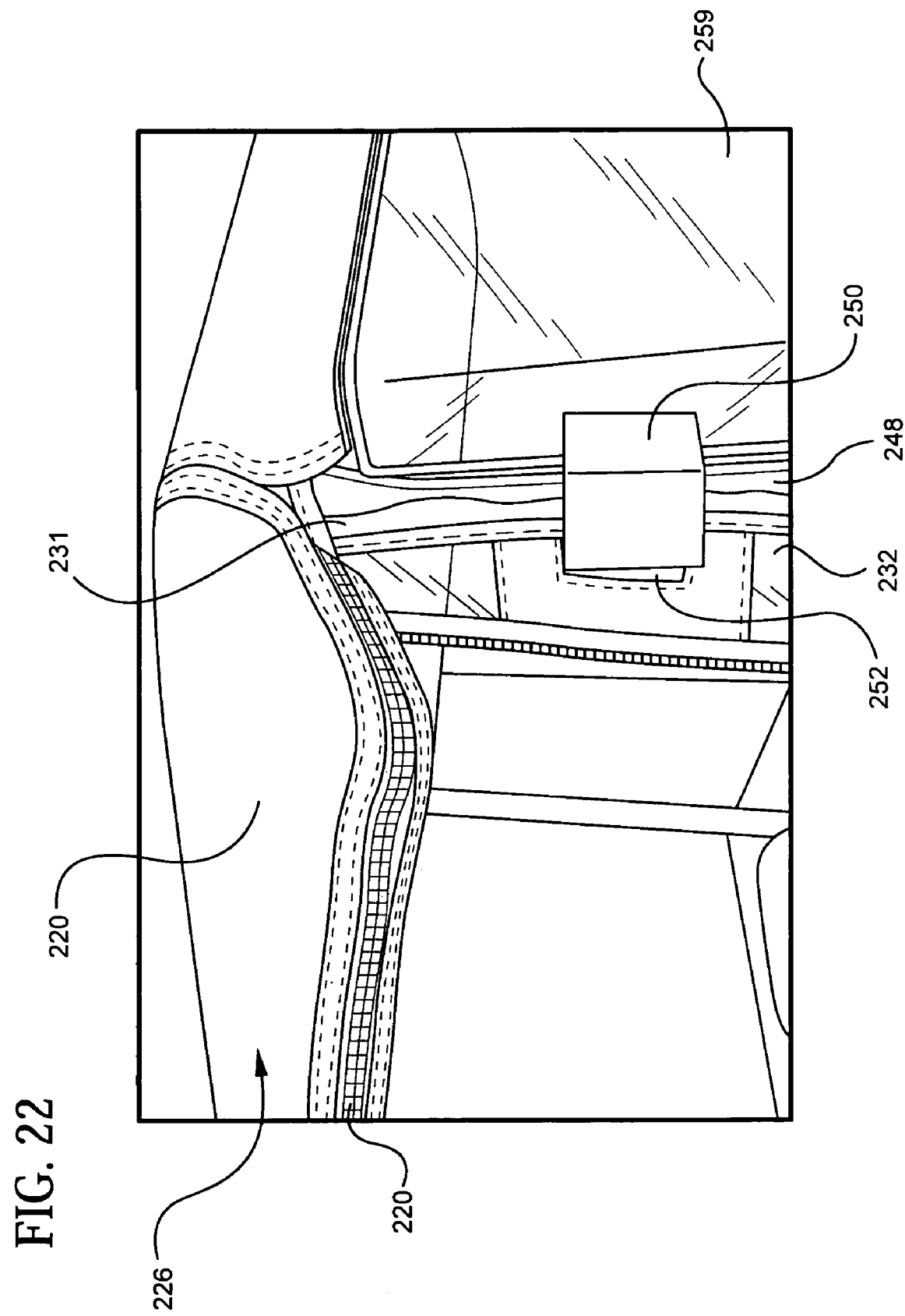
FIG. 22 shows a front view of the golf cart cover with a clamp attaching the right flap to a front frame member of the golf cart.
Figure 23:
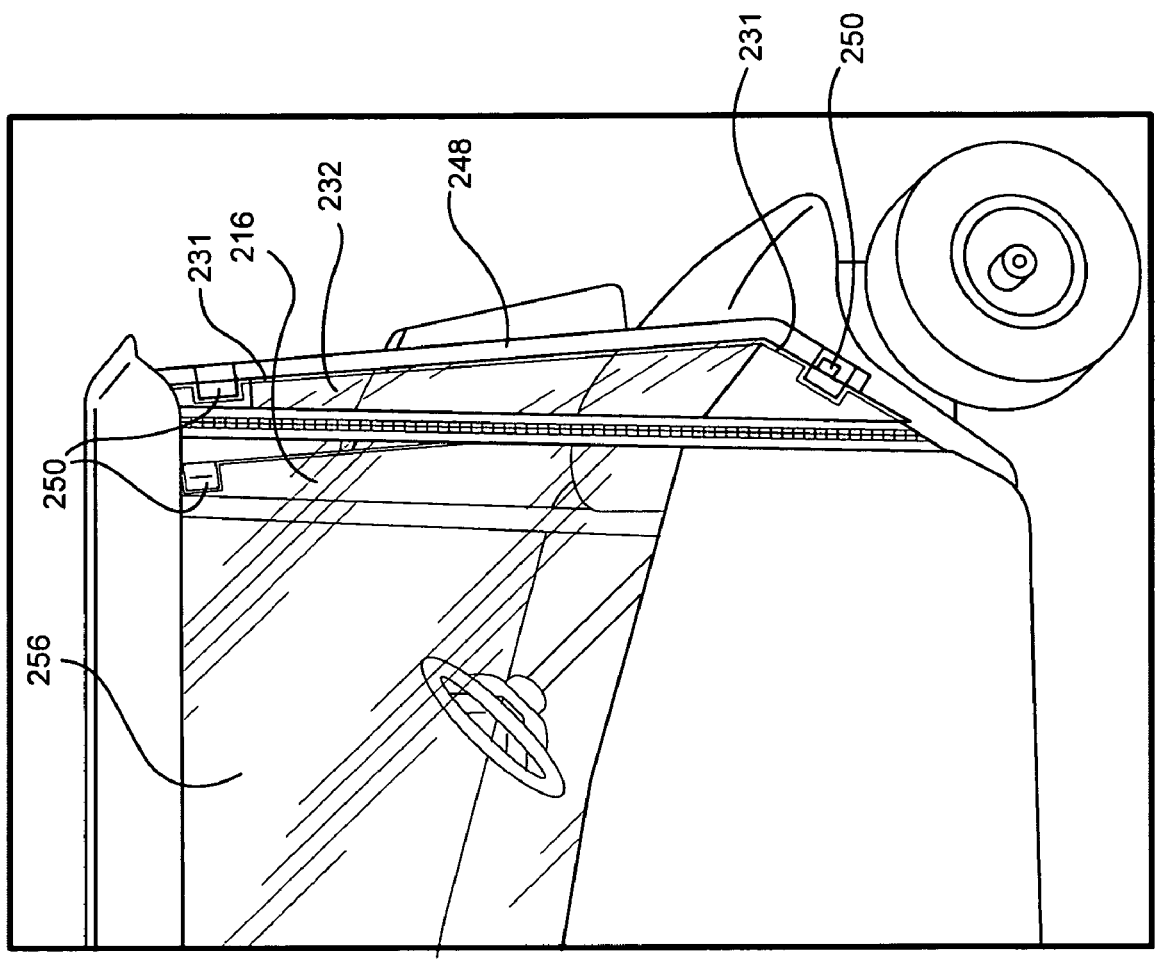
FIG. 23 shows a side view of the golf cart cover with a clamp attaching the right flap to a front frame member of the golf cart.
Figure 24:
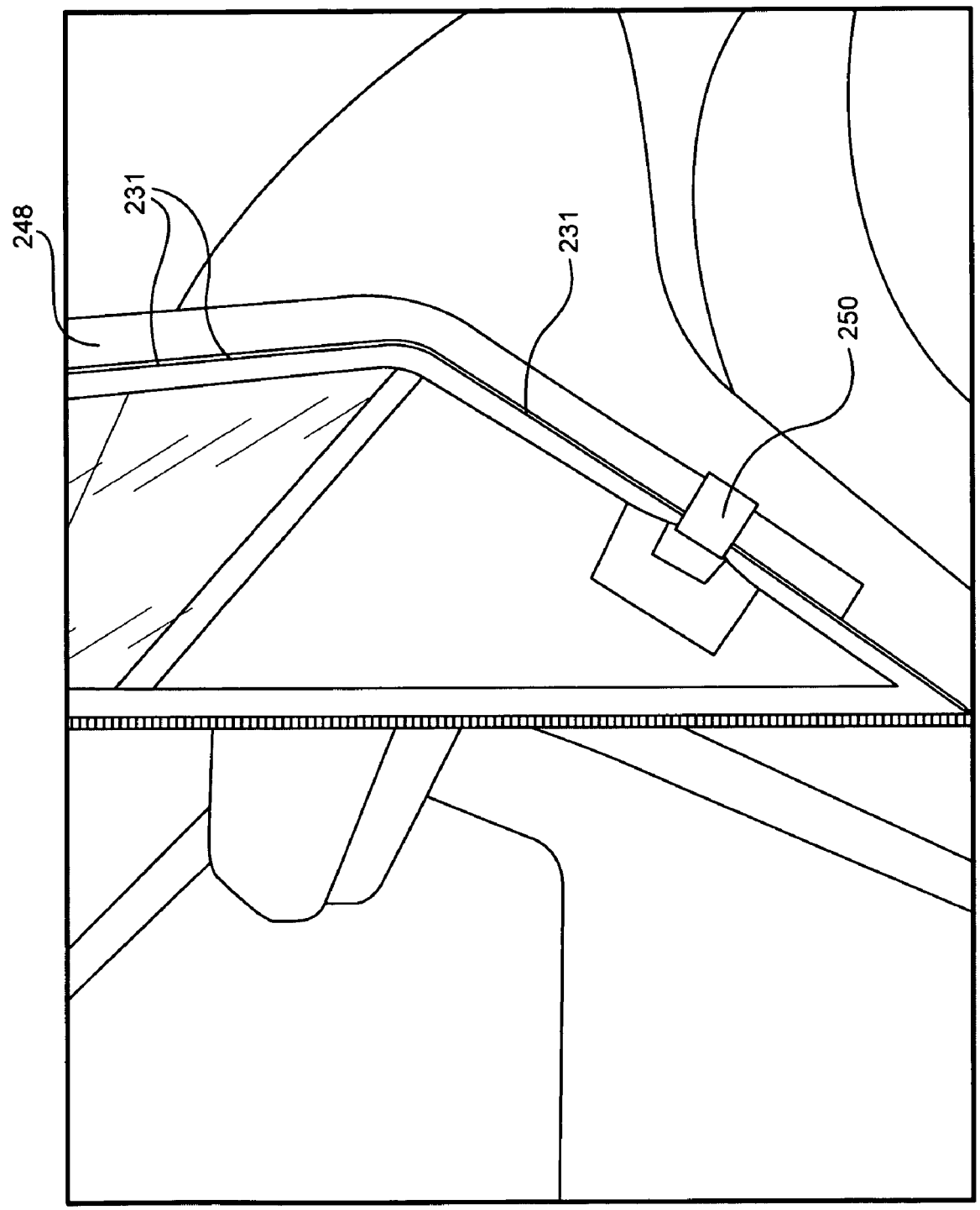
FIG. 24 shows a side exploded view of the golf cart cover with the clamp attaching the right flap to a front frame member of the golf cart.
Figure 25:
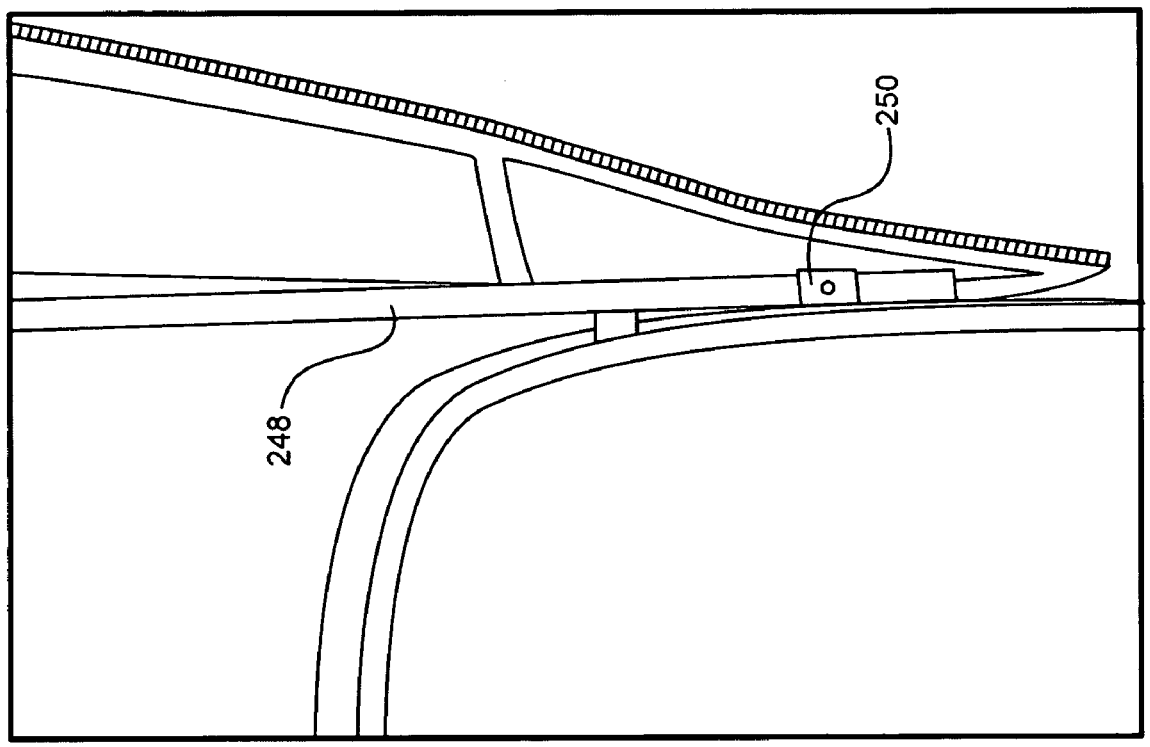
FIG. 25 shows a view taken from inside the golf cart with the clamp attaching the right flap to the front frame member of the golf cart.

As best shown in FIG. 21 with reference to the right flap 216, the upper edge of the lower boot flap 222 is preferably stitched to the interior of the top surface 212, or is made as a part of the top surface 212, and the upper edge of the upper boot flap 220 is preferably stitched to the exterior of the top surface 212, or is made as a part of the top surface 212. The right flap 216 is preferably attached along the edge of the top surface 212 between the boot flaps, or is made a part of the top surface 212, so that when rolled up, the right flap 216 can be enclosed between the upper flap 220 and lower flap 222 using the zipper 224 or other type of fastener. The boot flaps of the integrated storage boot 226 corresponding to the left flap 214, rear flap 218, and front flap 259 shown in FIG. 22 are preferably similarly attached to the top surface 12 for storing the respective flaps when not in use.

Alternate means of attaching the flaps to the top surface 212 are intended to be within the scope of the invention, including buttons, snaps, hook-and-loop fasteners, and the like. Such temporary means of attaching any of the left 214, right 216, rear 218, and front 259 flaps enables periodic removal of individual flaps for cleaning.

The golf cart cover 210 of the present invention may be used on golf carts that include a support frame with vertical members and a top frame surface, on which the top surface 212 of the cover 210 may be supported. The top surface 212 of the golf cart cover 210 preferably overlays the top frame surface, which is typically a solid surface. However, the top surface 212 may also be supported by a top frame surface formed, for example, by the tops of the four vertical members, or by a rectangular frame attached to the four vertical members.

Preferably, the cover 210 is shaped and sized to provide a tight, well-sealed fit in order to protect the interior of the cart, its passengers, and its contents from exposure to the elements. In addition, the cover 210 is suitably shaped to provide an aesthetically pleasing fit to the existing frame of the golf cart. Though not intended to be removed for storage, the cover 210 may be entirely removed for cleaning if desired.

When first installed onto a motorized golf car, the cover 210 is preferably held firmly in place by providing a contoured fit of the top surface 212 to the top frame surface of the golf cart. Referring particularly to FIGS. 18, 20, and 23-25, the front portion 232 of each side flap of the golf cart cover 210, for example, is also preferably contoured to a front vertical frame member or strut 248 on each side of the golf cart. The front portion 232 is then preferably attached to the front frame member 248 on each side of the car with at least two (2) clamps 250. A rigid or semi-rigid plate, bar, or member 231 is preferably enclosed within or attached to the front portion 232 of each side flap, which is then held against the front frame members 248 by the clamp 250. The member 231 is preferably contoured to fit and/or mirrors the shape of the front frame member 248 such that the clips 250 can function to effectively retain the front portions 232 of each side flap against the front frame members 248 along their entire length or at least a portion of their entire length.

Referring to FIG. 22, each clamp 250 preferably attaches one of the flaps to a vertical support member 248 through corresponding reinforced apertures 252 in the cover 210. In the embodiment shown, the clamp 250 attaches to the front portion 232 of the right flap 216. As shown in FIGS. 18 and 23-25, preferably, a second clamp 250 attaches to a lower segment of the front portion 232 in the same manner. The clamps 250 may also be used to secure additional portions of the cover 210 to the golf cart while remaining within the scope of the present invention.

The contoured fit and initial installation of the cover 210 may also be augmented by providing the edges of the top surface 212 with an elasticized border that fits under and hugs the rim of the top surface of the golf cart. Optionally, various other means of attachment as provided herein, such as buttons, snaps, hook-and-loop fasteners, and the like may be used to securely fasten the cover 210 to the golf car.

As shown in FIG. 20, a rigid transparent front windshield 254 is preferably formed from, for example, Lucite®, Plexiglas®, and the like. The windshield 254 is preferably a two-piece construction having a hinge 253 between its upper 255 and lower 257 portions. This enables the upper portion 255 to be folded down to permit greater air circulation within the passenger compartment if so desired.

Alternatively, referring to FIG. 22, the golf cart cover of the present invention may include a flexible front flap 259 directed downward from the top surface 212 in a similar manner to that of the right flap 216, which acts as a windshield when rolled down. In this case, the clamp 250 may attach both the front flap 259 and the front portion 232 of the right flap 216 to the front frame member 248.

As shown in FIG. 22, the front portion 232 may stay in the rolled down position to provide additional protection to the driver and passenger from direct exposure to the elements, while keeping the central portion 230 and the rear portion 228 in the rolled-up position and safely zippered in the integrated storage boot 226.

Preferably, the entire outer surface of the cover 210 is made from a water-resistant material, such as canvas, nylon, vinyl, a combination thereof, and/or the like. As best shown in FIGS. 18 and 20, the cover 210 of the present invention may be apportioned into an upper portion 256 and a lower portion 258. The lower portion 258 of each of the left 214, right 216, and rear 218 flaps is preferably formed from the same or a similar material as the top surface 212 and the outer surface of the storage boot 226, for example, a durable and water-resistant canvas material. To preserve an aesthetically pleasing appearance, the lower portion 258, top surface 212 and boot 226 are preferably of the same or complementary colors.

The upper portion 256 of the left 214, right 216, and rear 218 flaps, as well as the front windshield 259, if provided, are preferably formed from a thin, flexible, transparent material, such as any clear vinyl, plastic, or other material that is waterproof and durable. The upper portion 256 preferably provides adequate visibility for passengers to see outside the passenger compartment.

As one skilled in the art will appreciate, any number of variations of golf cart covers may be formed according to the present invention, including any combination or all of the flaps disclosed (left 214, right 216, rear 218, and front 254, 259) in various shapes and orientations. In addition, any known means to secure the boot members together to enclose one or more flaps within a boot for protection from wind, rain, sun, debris and/or other elements are within the scope of the present invention.

Although illustrative embodiments of the present invention have been described herein with reference to the accompanying drawings, it is to be understood that the invention is not limited to those precise embodiments, and that various other changes and modifications may be applied therein by one skilled in the art without departing from the scope or spirit of the invention.

What is claimed is:

1. A cover assembly adapted to at least partially cover a golf cart comprising a seating compartment and a support frame comprising vertical support members and a top frame surface extending over the seating compartment, the cover assembly comprising:
   a top surface adapted to overlay the top frame surface;
   a first side flap attached to the top surface, the first side flap covering at least a portion of a side of the golf cart in a rolled-down position; and
   a first storage boot comprising a first upper boot flap, a first lower boot flap, and a releasable fastener adapted to secure the first upper boot flap to the first lower boot flap, at least a portion of the first storage boot being attached to the top surface, the first storage boot being adapted to enclose the first side flap in a rolled-up position.

2. The cover assembly of claim 1, further comprising a clamp adapted to secure at least a portion of the first side flap to at least one of the vertical support members.

3. The cover assembly of claim 2, the first side flap comprising an aperture through which the clamp is positioned.

4. The cover assembly of claim 2, further comprising:
   a first contoured member attached to the first side flap, the first contoured member comprising a contour substantially similar to that of at least one of the vertical support members, the first contoured member comprising a substantially rigid material that maintains the contour of the first contoured member; and
   a first clamp securing the first contoured member to at least one of the vertical support members, thereby holding the first side flap to at least one of the vertical support members.

5. The cover assembly of claim 1, wherein the first side flap comprises a central portion, a left portion, a right portion, and releasable fasteners adapted to attach the central portion to the left portion and the right portion.

6. The cover assembly of claim 5, wherein the releasable fasteners adapted to attach the central portion to the left portion and the right portion comprise at least one of a zipper, a button, a snap, and a hook-and-loop fastener.

7. The cover assembly of claim 1, further comprising:
- a second side flap attached to the top surface, the second side flap covering at least a portion of a side of the golf cart opposing a portion of the golf cart covered by the first side flap in the rolled-down position; and
- a second storage boot adapted to at least partially enclose the second side flap in the rolled-up position, the second storage boot comprising:
  - a second upper boot flap;
  - a second lower boot flap; and
  - a second releasable fastener adapted to fasten the second upper boot flap to the second lower boot flap, the second storage boot being adapted to enclose the second side flap in the rolled-up position.

8. The cover assembly of claim 7, further comprising:
- a second contoured member attached to the second side flap, the second contoured member comprising a contour substantially similar to that of at least one of the vertical support members, the second contoured member comprising a substantially rigid material that maintains the contour of the second contoured member; and
- a second clamp securing the second contoured member to at least one of the vertical support members, thereby holding the second side flap to at least one of the vertical support members.

9. The cover assembly of claim 7, wherein the releasable fastener adapted to fasten the second upper boot flap to the second lower boot flap comprises at least one of a zipper, a button, a snap, and a hook-and-loop fastener.

10. The cover assembly of claim 1, further comprising a rear flap, the rear flap covering at least a portion of a rear of the golf cart in the rolled-down position.

11. The cover assembly of claim 10, further comprising a rear storage boot adapted to at least partially enclose the rear flap in the rolled-up position, the rear storage boot comprising:
- a rear upper boot flap;
- a rear lower boot flap; and
- a rear releasable fastener adapted to fasten the rear upper boot flap to the rear lower boot flap, thereby at least partially enclosing the rear flap in the rolled-up position therein.

12. The cover assembly of claim 11, wherein the releasable fastener adapted to fasten the rear upper boot flap to the rear lower boot flap comprises at least one of a zipper, a button, a snap, and a hook-and-loop fastener.

13. The cover assembly of claim 1, wherein the releasable fastener adapted to fasten the first upper boot flap to the first lower boot flap comprise at least one of a zipper, a button, a snap, and a hook-and-loop fastener.

14. The cover assembly of claim 1, further comprising a front flap, the front flap covering at least a portion of a front of the golf cart in the rolled-down position.

15. The cover assembly of claim 14, further comprising a front storage boot adapted to at least partially enclose the front flap in the rolled-up position, the front storage boot comprising:
- a front upper boot flap;
- a front lower boot flap; and
- a front releasable fastener adapted to fasten the front upper boot flap to the front lower boot flap, thereby at least partially enclosing the front flap in the rolled-up position therein.

16. The cover assembly of claim 15, comprising a third clamp adapted to secure at least a portion of the first side flap and at least a portion of the front flap to at least one of the vertical support members.

17. The cover assembly of claim 15, wherein the releasable fastener adapted to fasten the front upper boot flap to the front lower boot flap comprises at least one of a zipper, a button, a snap, and a hook-and-loop fastener.

18. A cover adapted to at least partially cover a golf cart comprising a seating compartment and a support frame comprising vertical support members and a top frame surface extending over the seating compartment, the cover comprising:
- a top surface adapted to overlay the top frame surface;
- a right side flap attached to the top surface, the right side flap covering at least a portion of a right side of the golf cart in a rolled-down position;
- a right storage boot adapted to at least partially enclose the right side flap in a rolled-up position;
- a left side flap attached to the top surface, the left side flap covering at least a portion of a left side of the golf cart in the rolled-down position; and
- a left storage boot adapted to at least partially enclose the left side flap in the rolled-up position.

19. The cover of claim 18, further comprising a clamp adapted to secure at least a portion of at least one of the right side flap, and the left side flap to at least one of the vertical support members.

20. The cover of claim 18, further comprising:
- a first contoured member attached to at least one of the right side flap and the left side flap, the first contoured member comprising a contour substantially similar to that of at least one of the vertical support members, the first contoured member comprising a substantially rigid material that maintains the contour of the first contoured member; and
- a first clamp securing the first contoured member to at least one of the vertical support members, thereby holding at least one of the right side flap and the left side flap to at least one of the vertical support members.

* * * * *

UNITED STATES PATENT AND TRADEMARK OFFICE
CERTIFICATE OF CORRECTION

PATENT NO.         : 7,448,666 B2                                    Page 1 of 1
APPLICATION NO. : 11/342332
DATED                 : November 11, 2008
INVENTOR(S)       : Stephen Edward Tyrer It is certified that error appears in the above-identified patent and that said Letters Patent is hereby corrected as shown below:

TITLE PAGE:

Item 74 Now reads:    "Hoffman & Baron, LLP"

Item 74 Should read:  -- Hoffmann & Baron, LLP --

Column 1, line 45:

Now reads:    "atheistically"

Should read:  -- aesthetically --

Column 7, line 26:

Now reads:    "(-shaped cross"

Should read:  -- C-shaped cross --

Column 15, line 8:

Now reads:    "motorized golf car"

Should read:  -- motorized golf cart --

Signed and Sealed this

Fourteenth Day of July, 2009

JOHN DOLL
*Acting Director of the United States Patent and Trademark Office*